US011454982B1

United States Patent
Kimchi et al.

(10) Patent No.: US 11,454,982 B1
(45) Date of Patent: Sep. 27, 2022

(54) DIRECTED AUDIO-ENCODED DATA EMISSION SYSTEMS AND METHODS FOR VEHICLES AND DEVICES

(71) Applicant: Amazon Technologies, Inc., Seattle, WA (US)

(72) Inventors: Gur Kimchi, Seattle, WA (US); Brian Beckman, Newcastle, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 413 days.

(21) Appl. No.: 16/666,263

(22) Filed: Oct. 28, 2019

(51) Int. Cl.
*G05D 1/02* (2020.01)
*G08G 1/16* (2006.01)
*G05D 1/00* (2006.01)
*G06V 20/58* (2022.01)
*G06V 40/10* (2022.01)

(52) U.S. Cl.
CPC ......... *G05D 1/0255* (2013.01); *G05D 1/0094* (2013.01); *G05D 1/024* (2013.01); *G05D 1/0248* (2013.01); *G06V 20/58* (2022.01); *G06V 40/103* (2022.01); *G08G 1/166* (2013.01)

(58) Field of Classification Search
CPC .... G05D 1/0255; G05D 1/0248; G06V 20/58; H04W 4/40
See application file for complete search history.

(56) References Cited

U.S. PATENT DOCUMENTS

| 7,106,180 B1* | 9/2006 | Pompei ............... G08B 3/10 381/387 |
| 10,773,643 B1 | 9/2020 | Patnaik |
| 2005/0040935 A1 | 2/2005 | Ewert et al. |
| 2011/0199199 A1 | 8/2011 | Perkins |
| 2013/0261887 A1 | 10/2013 | Raz et al. |
| 2014/0015973 A1 | 1/2014 | Vasquez et al. |
| 2017/0120814 A1* | 5/2017 | Kentley ............. B60C 5/008 |
| 2018/0146289 A1 | 5/2018 | Namm |
| 2018/0290590 A1* | 10/2018 | Goldman-Shenhar ......... B60Q 9/008 |

* cited by examiner

*Primary Examiner* — Abby Y Lin
*Assistant Examiner* — Renee LaRose
(74) *Attorney, Agent, or Firm* — Athorus, PLLC

(57) ABSTRACT

Directed audio-encoded data emissions systems and methods may include one or more sensors, one or more audio transmitters, and a controller configured to cause emission of directed audio-encoded data toward various objects, such as vehicles, user devices, audio input/output devices, or others. For example, responsive to detecting a potential safety situation and/or a potential intended communication situation associated with one or more detected objects, audio-encoded data having selected audio characteristics may be emitted toward the detected objects using selected audio transmitters. The audio characteristics may be selected to encode one or more instructions to be executed by the detected objects, and the instructions may cause emission of audio, visual, or haptic notifications and/or initiation of various functions or operations by the objects.

17 Claims, 9 Drawing Sheets

DIRECTED AUDIO-ENCODED DATA EMISSION SYSTEMS AND METHODS FOR VEHICLES AND DEVICES

BACKGROUND

Unmanned, autonomous, and/or electric vehicles, such as aerial vehicles, ground vehicles, and water based automated vehicles, are continuing to increase in use. For example, autonomous and/or electric ground vehicles and aerial vehicles may be used for transportation or deliveries, with improved speed, efficiency, and safety. While there may be many beneficial uses of these vehicles, operating and navigating autonomous and/or electric vehicles safely and efficiently within various environments including other vehicles, people, and/or animals may be challenging. Accordingly, there is a need for automated systems and methods to maintain safety among autonomous and/or electric vehicles, other vehicles, people, and/or animals within various environments.

DETAILED DESCRIPTION

Figure 1:
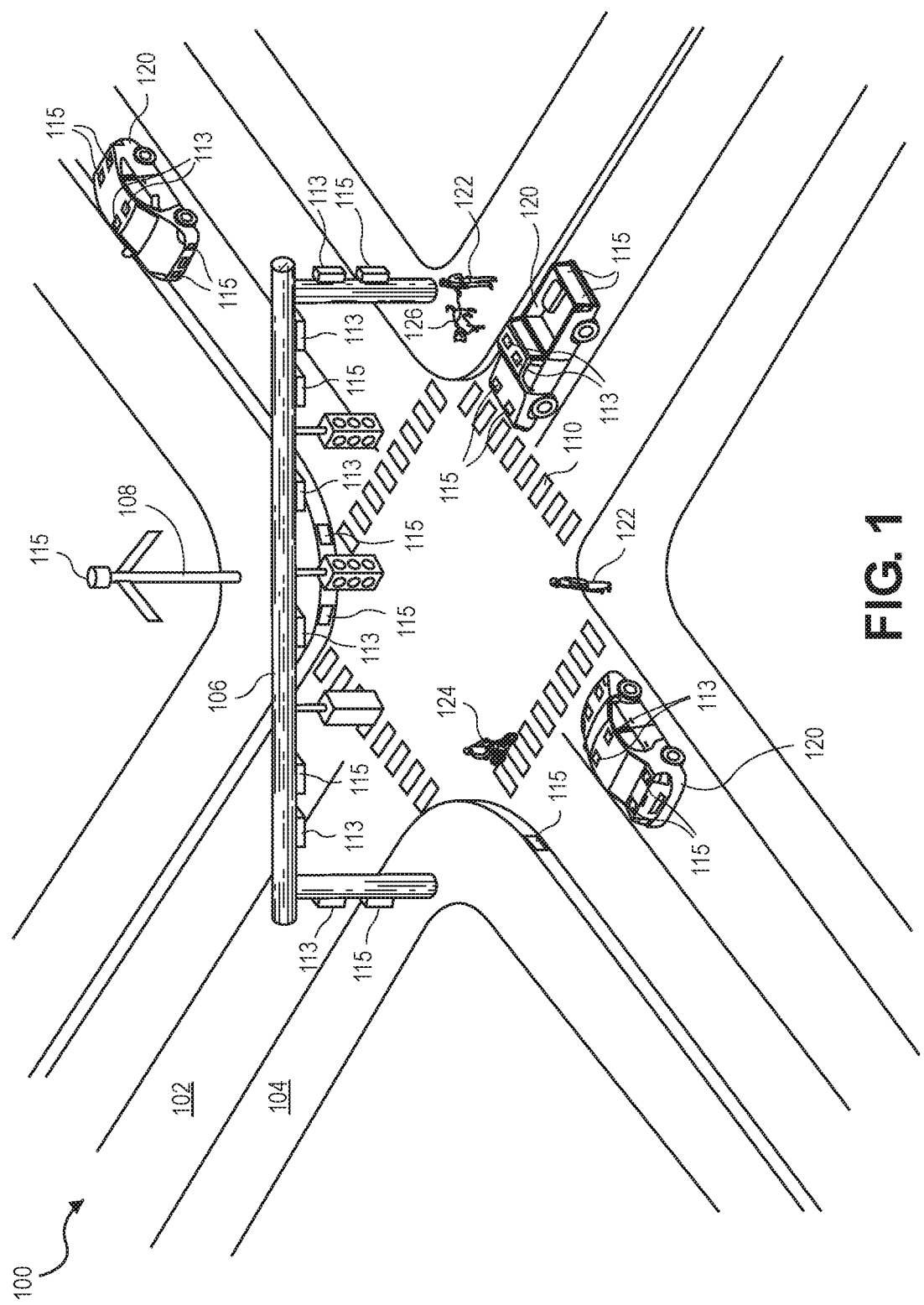
FIG. 1 is a schematic diagram of an example environment including a directed audio emission system, in accordance with implementations of the present disclosure.

As is set forth in greater detail below, implementations of the present disclosure are related to directed audio emission systems and methods to provide safety and/or communication between and among autonomous and/or electric vehicles, other vehicles, people, animals, and/or others.

For example, various types of vehicles, such as autonomous ground vehicles or electric vehicles, may utilize electric motors or other relatively quiet modes of propulsion. As a result, it may be difficult for pedestrians, cyclists, other people, animals, and/or operators of other vehicles to ascertain whether such vehicles are currently operating. Thus, potential safety situations may arise in environments in which such vehicles are operating around or in proximity to other vehicles, people, animals, or others.

One possible solution may be to require all types of vehicles, whether autonomous, electric, or otherwise, to generally emit noise or sound to indicate to pedestrians, cyclists, other people, animals, and/or operators of other vehicles in proximity that such vehicles are currently operating. However, the general and undirected emission of noise or sound may substantially and/or unnecessarily increase noise levels or noise pollution in environments in which such vehicles are operating.

In example embodiments, the directed audio emission systems and methods described herein may direct, focus, or beam-form various types of audio output based on determinations of potential safety situations, and/or desired or intended communications, between and among autonomous and/or electric vehicles, other vehicles, people, animals, and/or others.

For example, one or more objects in an environment may be detected by one or more sensors associated with vehicles, devices, and/or portions of the environment. Various characteristics of the one or more objects may be determined, such as object type, position, orientation, distance, movement, speed, or acceleration. In some example embodiments, the one or more objects may also be identified, e.g., a specific person, animal, vehicle, or device. Further, the various characteristics of the one or more objects may be processed to determine potential safety situations, such as collisions, interferences, or others, and/or to identify particular objects for intended communications, such as passengers, customers, or others.

In addition, one or more audio transmitters, such as phased array audio transmitters, may also be associated with vehicles and/or portions of the environment. Based on the detected objects and their various detected characteristics, one or more audio transmitters may be selected to emit directed audio toward the objects. In addition, various characteristics of the audio output may be selected, such as amplitude, frequency, phase, direction, angle, or range. Further, one or more types of audio output may also be selected, such as human-audible noise or sounds, human-audible alerts, human-discernable information, animal-audible noise or sounds, and/or audio-encoded data or information based on the detected objects and their various detected characteristics. In further example embodiments, human-audible noise, sounds, alerts, and/or information may be transmitted via dedicated channels to various types of audio input/output devices used by people, such as phones, earbuds, headphones, virtual reality or augmented reality devices, or other devices. Further, audio-encoded data or information may be transmitted to various types of devices or vehicles, which may decode the data or information and provide alerts or notifications to users of such devices or vehicles.

Using the directed audio emission systems and methods described herein, noise, alerts, notifications, information, and/or data may be transmitted between and among autonomous and/or electric vehicles, other vehicles, people, animals, devices, and/or others to thereby improve the safety and efficiency of operations of vehicles, such as autonomous vehicles, electric vehicles, or other vehicles, in proximity to people, animals, or others, while reducing or minimizing general or ambient noise levels or noise pollution that may otherwise be emitted into the environment by undirected noise emission systems.

FIG. 1 is a schematic diagram of an example environment 100 including a directed audio emission system, in accordance with implementations of the present disclosure.

As shown in FIG. 1, the example environment 100 may include a plurality of streets or roads 102 and a plurality of sidewalks 104 that may meet at an intersection. In addition, the intersection may include a traffic signal 106 such as one or more traffic lights, and/or traffic signs 108 such as street name signs, speed limit signs, or other traffic directing elements. Further, a plurality of crosswalks 110 may be associated with the intersection to facilitate crossing of the plurality of streets 102 by pedestrians 122, cyclists 124, animals 126 such as pets or guide or assistance animals, or others.

In example embodiments, the directed audio emission system may include one or more sensors 113 that may be associated with vehicles, devices, and/or portions of the environment. For example, the one or more sensors 113 may comprise imaging sensors, infrared sensors, depth or time-of-flight sensors, audio sensors, radar sensors, light detection and ranging (LIDAR) sensors, and/or other types of sensors. Various combinations of different types of sensors may be included in the example environment 100. As shown in FIG. 1, various sensors 113 may be associated with portions of the streets or roads 102, portions of the sidewalks 104, portions of the traffic signal 106, portions of the street signs 108, and/or one or more vehicles 120 that may be present in the example environment 100. In addition, various sensors 113 may be associated with various devices or user devices used by people, such as phones, earbuds, headphones, virtual reality or augmented reality devices, or other devices, responsive to such persons opting in, allowing, or enabling use of portions of such user devices as sensors 113 to maintain safety within an environment, including maintaining safety of people using such user devices. User devices may also include various other types of computing devices, such as tablet computers, laptop computers, handheld or wearable computing devices, or other similar computing devices. Each of the one or more sensors 113 may be configured to detect one or more objects in the example environment, such as vehicles, people, audio input/output devices used by people, animals, or other objects.

In further example embodiments, the directed audio emission system may include one or more audio transmitters 115 that may also be associated with vehicles, devices, and/or portions of the environment. For example, the one or more audio transmitters 115 may comprise phased array audio transmitters, or other speakers or audio transmitters configured to emit beam-formed audio output. Various combinations of different types of audio transmitters may be included in the example environment 100. As shown in FIG. 1, various audio transmitters 115 may be associated with portions of the streets or roads 102, portions of the sidewalks 104, portions of the traffic signal 106, portions of the street signs 108, and/or one or more vehicles 120 that may be present in the example environment 100. In addition, various audio transmitters 115 may be associated with various devices or user devices used by people, such as phones, earbuds, headphones, virtual reality or augmented reality devices, or other devices, responsive to such persons opting in, allowing, or enabling use of portions of such user devices as audio transmitters 115 to maintain safety within an environment, including maintaining safety of people using such user devices. User devices may also include various other types of computing devices, such as tablet computers, laptop computers, handheld or wearable computing devices, or other similar computing devices. Each of the one or more audio transmitters 115 may be configured to emit beam-formed audio output toward one or more detected objects in the example environment, such as vehicles, people, audio input/output devices used by people, animals, or other objects.

Figure 9:
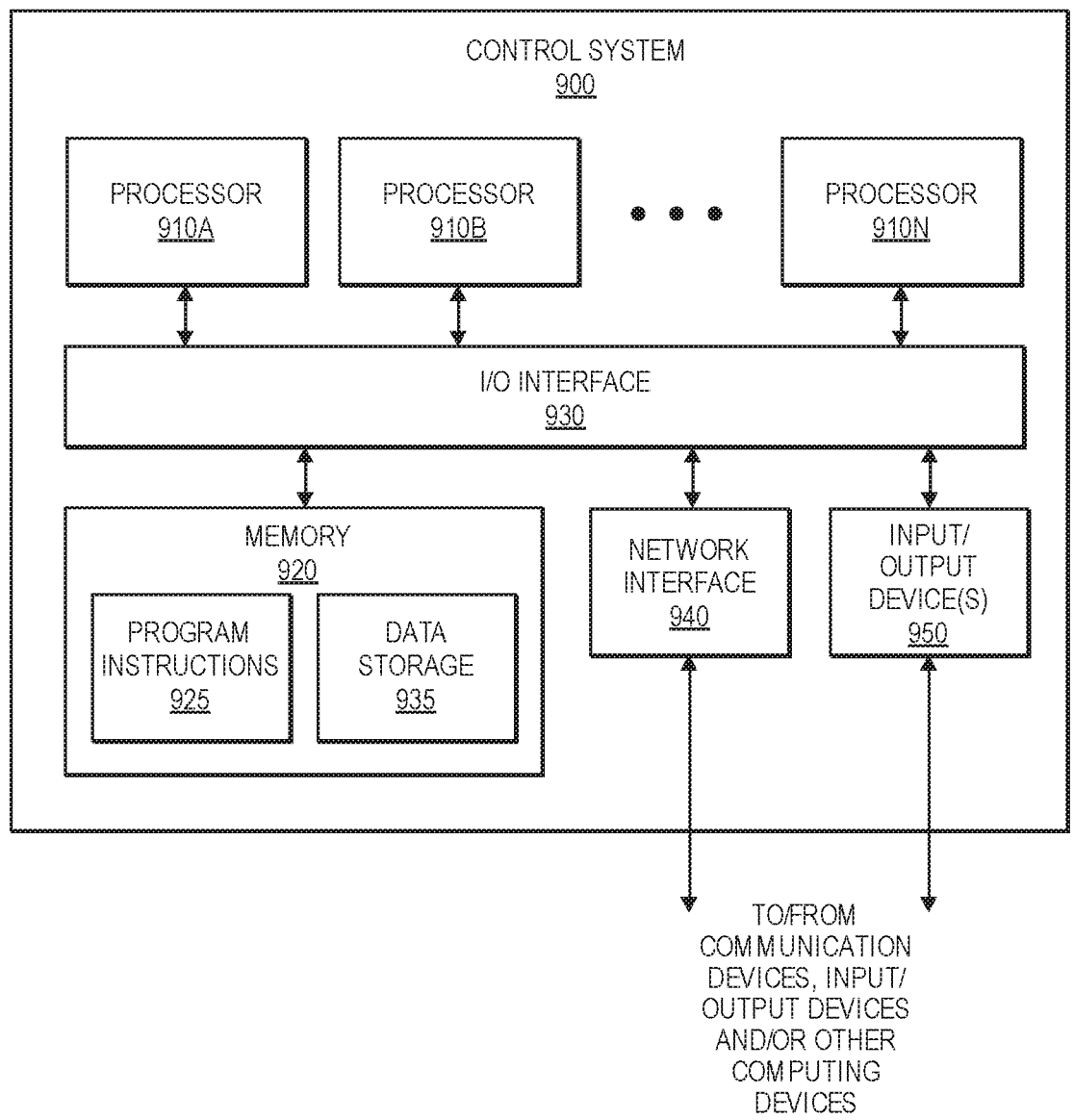
FIG. 9 is a block diagram illustrating various components of an example control system, in accordance with implementations of the present disclosure.

Furthermore, a controller or control system, as described herein at least with respect to FIG. 9, may be in communication with the sensors 113 and the audio transmitters 115 via satellite networks, cellular networks, WiFi networks, Bluetooth, or other types of communication networks. The controller may receive data from the sensors 113 associated with one or more detected objects and may provide instructions or commands to the audio transmitters 115 to emit directed, or beam-formed, audio output toward one or more detected objects.

In example embodiments, the controller may process the data received from the sensors 113 to detect one or more objects in the environment, such as people, animals, vehicles, or others. The controller may utilize various image recognition and image processing techniques or algorithms, depth or range data processing techniques or algorithms, audio data processing techniques or algorithms, radar data processing techniques or algorithms, LIDAR data processing techniques or algorithms, and/or other types of processing techniques or algorithms to detect one or more objects in the environment.

Using one or more of the various processing techniques or algorithms, the controller may further process the data received from the sensors 113 to identify one or more characteristics associated with the detected objects, such as object type, position, orientation, distance, movement, speed, acceleration, or other characteristics. For example, the object type may comprise a vehicle, a person, an audio input/output device used by a person, an animal, or other type of object. The position and orientation of the object may comprise a position and orientation relative to one or more sensors that detected the object, and the distance to the object may comprise a distance, range, depth, or time-of-flight from the one or more sensors that detected the object. Based on the position, orientation, and/or distance of an object relative to one or more sensors, an absolute position and/or orientation of the object relative to a defined coordinate or reference frame of the environment may be determined. In addition, the movement, speed, or acceleration of the object may be determined based on data received from the one or more sensors over time, and/or based on Doppler effect in the case of radar sensors. Based on the movement, speed, and/or acceleration of the object within the environment, subsequent positions and/or orientations of the object within the environment may be predicted or expected, e.g., using various types of models or algorithms such as physics models, geometric models, path planning models, mapping models, three-dimensional space models, or other types of processing and analysis techniques.

In further example embodiments, the controller may further process the data received from the sensors 113 to identify one or more particular objects from among the detected objects, such as a particular person or individual, a particular animal or animal type, a particular vehicle or vehicle type, or other particular objects. The identification of particular persons or individuals, as well as particular animals, vehicles, or other objects owned by particular persons or individuals, may be performed responsive to such persons opting in, allowing, or enabling such identification based on data received from the sensors 113.

Further, the controller may determine that a potential safety situation exists with respect to one or more particular objects from among the detected objects. For example, based on the detected characteristics of one or more particular objects, a potential collision, interference, or other safety situation may be determined or predicted, such as a pedestrian, cyclist, or animal entering or crossing a street along a path of a vehicle, a pedestrian crossing the path of a cyclist, a vehicle potentially colliding with another vehicle, or other potential safety situations. In other example embodiments, the controller may determine that one or more particular objects associated with intended or desired communication have been identified from among the detected objects. For example, the intended or desired communication may relate to transmitting information between a ride-sharing service vehicle or taxi vehicle and a potential passenger of the vehicle, transmitting information between a delivery vehicle and a customer to which a delivery is to be made, or other potential intended communication situations.

Responsive to determination of a potential safety situation or a potential intended communication situation, the controller may determine that directed audio is to be emitted toward the one or more particular objects. In this regard, the controller may select one or more audio transmitters within the environment to emit the directed audio, may select a type of audio output to emit, and may also select one or more audio characteristics of the audio output to emit. For example, a single audio transmitter, such as a phased array audio transmitter, may be selected to emit beam-formed audio output directed toward the particular objects based on characteristics of the particular objects. In addition, two or more audio transmitters, such as phased array audio transmitters, may be selected to concurrently or simultaneously emit beam-formed audio output directed toward the particular objects based on characteristics of the particular objects. In addition, the type of audio output may be selected based on characteristics of the particular objects, such as human-audible or human-discernable noise, sounds, alerts, notifications, or information intended for people, animal-audible noise or sounds intended for animals, and/or audio-encoded sounds, alerts, data, or information intended for vehicles, audio input/output devices used by people, or other types of devices. Further, the audio characteristics of the audio output may be selected based on characteristics of the particular objects, such as amplitude, frequency, phase, direction, angle, range, or others.

In example embodiments in which two or more audio transmitters are selected to emit directed audio to a single particular object, the audio characteristics may further be selected such that the audio output is particularly focused or directed toward the position of the single particular object. For example, amplitudes may be selected such that the combined amplitude of the audio output is greatest at the position of the single particular object and/or may be reduced or minimized at other positions in the environment, frequencies and/or phases may be selected such that the combined audio output is accentuated at the position of the single particular object and/or may be reduced or canceled out at other positions in the environment, directions and/or angles may be selected such that the combined audio output is focused at the position of the single particular object and/or may be reduced or minimized at other positions in the environment, and/or ranges may be selected such that the audio output is directed toward the position of the single particular object and/or may be reduced or minimized at relatively closer or relatively farther positions in the environment.

In this manner, the controller may instruct selected audio transmitters to emit directed, or beam-formed, selected audio output having selected audio characteristics responsive to determining one or more potential safety situations or potential intended communication situations. The selected audio output and selected audio characteristics may be tailored or customized to the particular objects, such as people, animals, vehicles, devices, or others, based on detected characteristics of the particular objects. Further, general, undirected, or ambient noise or sound levels within the environment may be substantially reduced for other objects, such as other people, animals, vehicles, or others, within the environment that may not be associated with any potential safety situations or potential intended communication situations.

Although FIG. 1 illustrates an example environment including a particular number, configuration, and arrangement of streets, roads, sidewalks, signs, or other elements at a traffic intersection, in other example embodiments, the example environments may include other numbers, configurations, or arrangements of streets, roads, signs, or other elements at other types of intersections, along various portions of streets, roads, or sidewalks, on highways or expressways, in parking lots or structures, in urban areas or rural areas, or in various other environments in which vehicles, people, and/or animals may be in proximity to each other. In further example embodiments, the example environments may include elements or components that are associated with navigation or travel of aerial vehicles, such as runways, taxiways, airfields, flight corridors, flight paths, air traffic control towers, or other aerial navigation elements, and/or may include elements or components that are associated with navigation or travel of water based vehicles, such as waterways, underpasses, docks, bridges, dams, water locks, or other water based navigation elements. In still further example embodiments, the example environments may include indoor environments, such as buildings, warehouses, manufacturing facilities, sortation facilities, delivery stations, or other facilities, and such indoor environments may include elements or components associated with operations or processes within such facilities, such as floors, walls, ceilings, columns, walkways, pathways, structures, machinery, equipment, lighting, ventilation systems, electrical systems, alarm or warning systems, forklifts, vehicles, self-guided vehicles, robotic devices or equipment, material handling equipment, or various other elements.

In addition, although FIG. 1 illustrates a directed audio emission system including a particular number, configuration, and arrangement of sensors and audio transmitters associated with vehicles, devices, and/or portions of the environment, in other example embodiments, the directed audio emission system may include other numbers, configurations, or arrangements of sensors and audio transmitters. For example, sensors and audio transmitters may be associated only with one or more vehicles or devices operating in an environment including vehicles, people, animals, or others. Alternatively, sensors and audio transmitters may be associated only with one or more portions of an environment in which vehicles or devices may operate in proximity to other vehicles, people, animals, or others. Further, various other combinations of sensors and/or audio transmitters may be associated with various vehicles, various devices, various portions of an environment, and/or combinations thereof.

Figure 2:
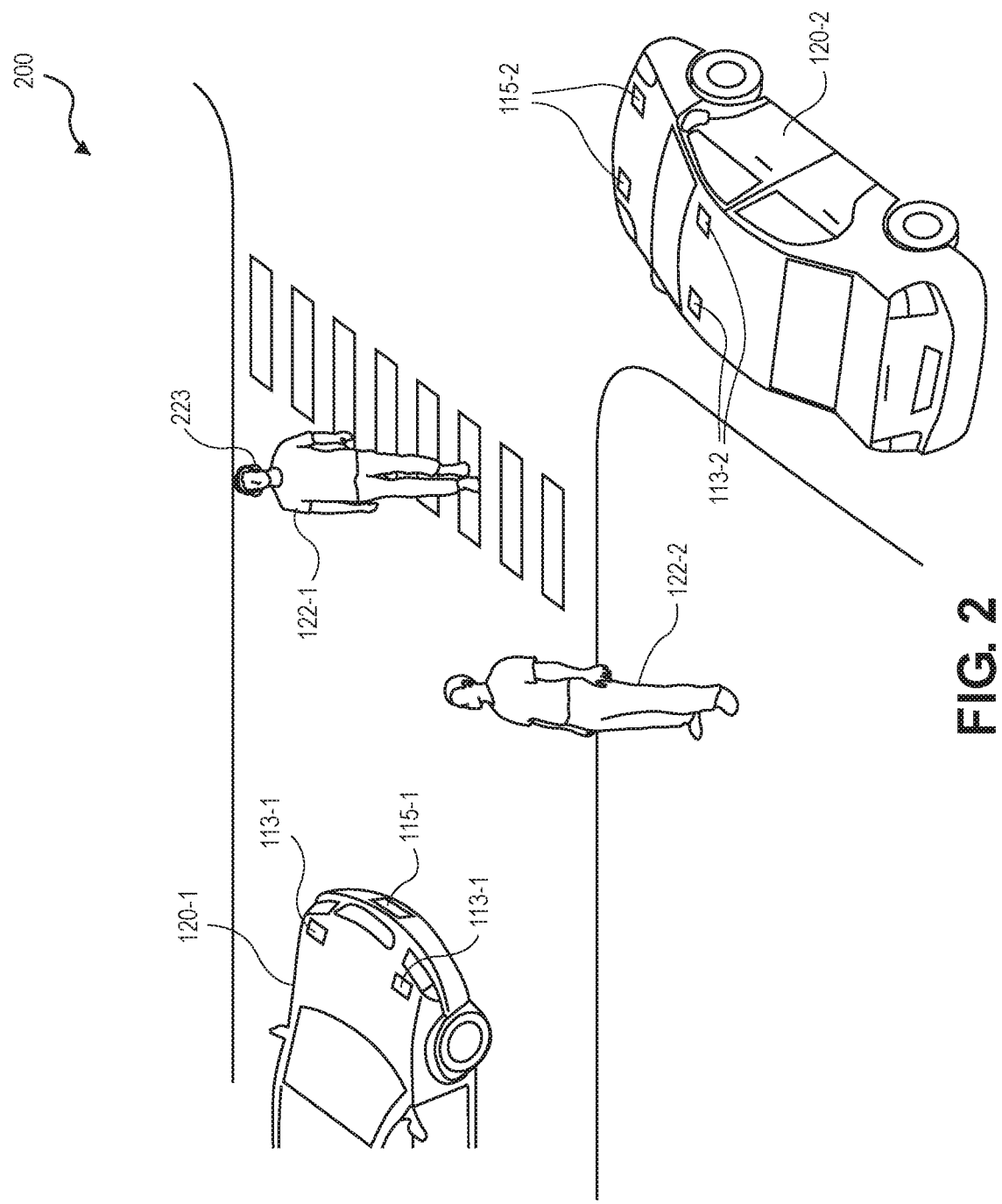
FIG. 2 is a schematic diagram of another example environment including a directed audio emission system, in accordance with implementations of the present disclosure.

FIG. 2 is a schematic diagram of another example environment 200 including a directed audio emission system, in accordance with implementations of the present disclosure.

As shown in FIG. 2, a vehicle 120-1 shown at the left side of FIG. 2, such as an autonomous vehicle, an electric vehicle, or other type of vehicle, may be approaching an intersection at which one or more pedestrians 122 and/or another vehicle 120-2 may be present. The vehicle 120-1 may include one or more sensors 113-1 and an audio transmitter 115-1. As described herein, the one or more sensors 113-1 may comprise various types of sensors configured to detect one or more objects in proximity to the vehicle 120-1, and the audio transmitter 115-1 may comprise phased array audio transmitters or other types of audio transmitters configured to emit directed audio toward one or more detected objects.

In the example embodiment shown in FIG. 2, the one or more sensors 113-1 associated with the vehicle 120-1 may receive data associated with one or more of the pedestrian 122-1 walking along the crosswalk at the intersection, the pedestrian 122-2 standing at the corner of the intersection, and/or the vehicle 120-2 at the intersection. Based on the data received from the one or more sensors 113-1, a controller, which may be associated with the vehicle 120-1 and/or may be remote from the vehicle 120-1 and in communication with the vehicle 120-1 and its components, may detect the pedestrians 122-1, 122-2, and the vehicle 120-2 using various processing techniques or algorithms.

With respect to the pedestrian 122-1 walking along the crosswalk at the intersection, the controller may detect, based on the data received from the one or more sensors 113-1, various characteristics associated with the pedestrian 122-1. For example, the controller may detect that the pedestrian 122-1 is a person, who is positioned and oriented along the crosswalk, is at a particular range or distance in front of the vehicle 120-1, and is moving from left to right from the perspective of the vehicle 120-1 at a particular speed. Further, the controller may also detect, based on the data received from the one or more sensors 113-1, that the pedestrian 122-1 is using or wearing an audio input/output device 223, such as headphones. Other audio input/output devices 223 that may be detected may include phones, earbuds, virtual reality or augmented reality devices, or other devices.

Based on the detected characteristics of the pedestrian 122-1, the controller may determine or predict a potential safety situation between the vehicle 120-1 and the pedestrian 122-1, such as a potential collision, interference, or accident. As a result, the controller may determine to emit directed audio toward the pedestrian 122-1.

In the example embodiment shown in FIG. 2, the controller may select the audio transmitter 115-1 associated with the vehicle 120-1 to emit directed audio toward the pedestrian 122-1. In addition, the controller may select human-audible noises, sounds, or alerts and/or human-discernable information to emit as directed audio based on the determination that the detected object is a person, i.e., pedestrian 122-1. Further, the controller may select one or more audio characteristics for the directed audio to be emitted, such as amplitude, frequency, phase, direction, angle, range, or others. For example, the direction, angle, and/or range of the emitted audio output may be selected to focus on the position, orientation, range, and movement associated with the pedestrian 122-1 relative to the vehicle 120-1. In addition, based on the determination that the pedestrian 122-1 is using or wearing an audio input/output device 223, the controller may select audio characteristics, such as a high amplitude, a particular frequency, or others in order to ensure that the pedestrian 122-1 may hear the emitted audio output despite using or wearing the audio input/output device 223. In other example embodiments, if the audio input/output device 223 includes a dedicated channel for alerts, warnings, or notifications, such as a dedicated radio frequency or band or other dedicated communication channel or bandwidth, the audio transmitter 115-1 may emit directed audio using the dedicated channel that may interrupt or override any other audio provided by the audio input/output device, in order to ensure that the pedestrian 122-1 may hear the emitted audio output via the audio input/output device 223.

With respect to the pedestrian 122-2 standing at the corner of the intersection, the controller may detect, based on the data received from the one or more sensors 113-1, various characteristics associated with the pedestrian 122-2. For example, the controller may detect that the pedestrian 122-2 is a person, who is positioned and oriented at the corner of the intersection, is at a particular range or distance in front of and to the right of the vehicle 120-1, and is not currently moving but poised to enter the crosswalk in front of the vehicle 120-1.

Based on the detected characteristics of the pedestrian 122-2, the controller may determine or predict a potential safety situation between the vehicle 120-1 and the pedestrian 122-2, such as a potential collision, interference, or accident. As a result, the controller may determine to emit directed audio toward the pedestrian 122-2.

In the example embodiment shown in FIG. 2, the controller may select the audio transmitter 115-1 associated with the vehicle 120-1 to emit directed audio toward the pedestrian 122-2. In addition, the controller may select human-audible noises, sounds, or alerts and/or human-discernable information to emit as directed audio based on the determination that the detected object is a person, i.e., pedestrian 122-2. Further, the controller may select one or more audio characteristics for the directed audio to be emitted, such as amplitude, frequency, phase, direction, angle, range, or others. For example, the direction, angle, and/or range of the emitted audio output may be selected to focus on the position, orientation, and range associated with the pedestrian 122-2 relative to the vehicle 120-1.

With respect to the vehicle 120-2 at the intersection, the controller may detect, based on the data received from the one or more sensors 113-1, various characteristics associated with the vehicle 120-2. For example, the controller may detect that the vehicle 120-2 is a vehicle, that is positioned and oriented facing the intersection, is at a particular range or distance in front of and to the right of the vehicle 120-1, and is not currently moving but positioned to enter the intersection in front of the vehicle 120-1. Further, the controller may detect whether the vehicle 120-2 is being operated by a person, or whether the vehicle 120-2 is at least partially autonomously operated.

Based on the detected characteristics of the vehicle 120-2, the controller may determine or predict a potential safety situation between the vehicle 120-1 and the vehicle 120-2, such as a potential collision, interference, or accident. As a result, the controller may determine to emit directed audio toward the vehicle 120-2.

In the example embodiment shown in FIG. 2, the controller may select the audio transmitter 115-1 associated with the vehicle 120-1 to emit directed audio toward the vehicle 120-2. In addition, the controller may select human-audible noises, sounds, or alerts and/or human-discernable information to emit as directed audio based on the determination that the vehicle 120-2 is being operated by a person, and/or may select audio-encoded data or information to emit as directed audio, which may be received and decoded by a controller associated with the vehicle 120-2. Further, the controller may select one or more audio characteristics for the directed audio to be emitted, such as amplitude, frequency, phase, direction, angle, range, or others. For example, the direction, angle, and/or range of the emitted audio output may be selected to focus on the position, orientation, and range associated with the vehicle 120-2 relative to the vehicle 120-1. In addition, based on the determination that the vehicle 120-2 is being operated by a person, the controller may select audio characteristics, such as a high amplitude, a particular frequency, or others in order to ensure that the person operating the vehicle 120-2 may hear the emitted audio output over any other noise or audio, e.g., music or conversations, within the vehicle 120-2. In other example embodiments, if an audio input/output device, such as a radio, associated with the vehicle 120-2 includes a dedicated channel for alerts, warnings, or notifications, such as a dedicated radio frequency or band or other dedicated communication channel or bandwidth, the audio transmitter 115-1 may emit directed audio using the dedicated channel that may interrupt or override any other audio provided by the audio input/output device associated with the vehicle 120-2, in order to ensure that the person operating the vehicle 120-2 may hear the emitted audio output via the audio input/output device associated with the vehicle 120-2. Further, if the vehicle 120-2 is at least partially autonomously operated, the audio transmitter 115-1 may emit audio-encoded data as directed audio toward the vehicle 120-2, which may be received and decoded by a controller associated with the vehicle 120-2 and provided as audio and/or visual alerts, warnings, or notifications to persons within the vehicle 120-2 and/or used by the controller of the vehicle 120-2 to control operations and maintain safety of the vehicle 120-2.

Using the directed audio emission systems and methods described herein, selected audio output having selected audio characteristics may be emitted toward each of the pedestrian 122-1, the pedestrian 122-2, and the vehicle 120-2 concurrently, substantially simultaneously, and/or sequentially by the audio transmitter 115-1, or respective portions thereof. In addition, audio output directed toward each of the pedestrian 122-1, the pedestrian 122-2, and the vehicle 120-2 may not be audible, or only faintly audible, to others of the pedestrian 122-1, the pedestrian 122-2, and the vehicle 120-2, such that each pedestrian or vehicle may receive substantially only audio output that is specifically directed thereto. Further, other people, vehicles, animals, or other objects (not shown) that may also be in proximity to the vehicle 120-1 but that are not determined to be associated with potential safety situations with the vehicle 120-1 may also not receive, or only faintly receive, the selected audio output that is directed toward each of the pedestrian 122-1, the pedestrian 122-2, and the vehicle 120-2.

Figure 3:
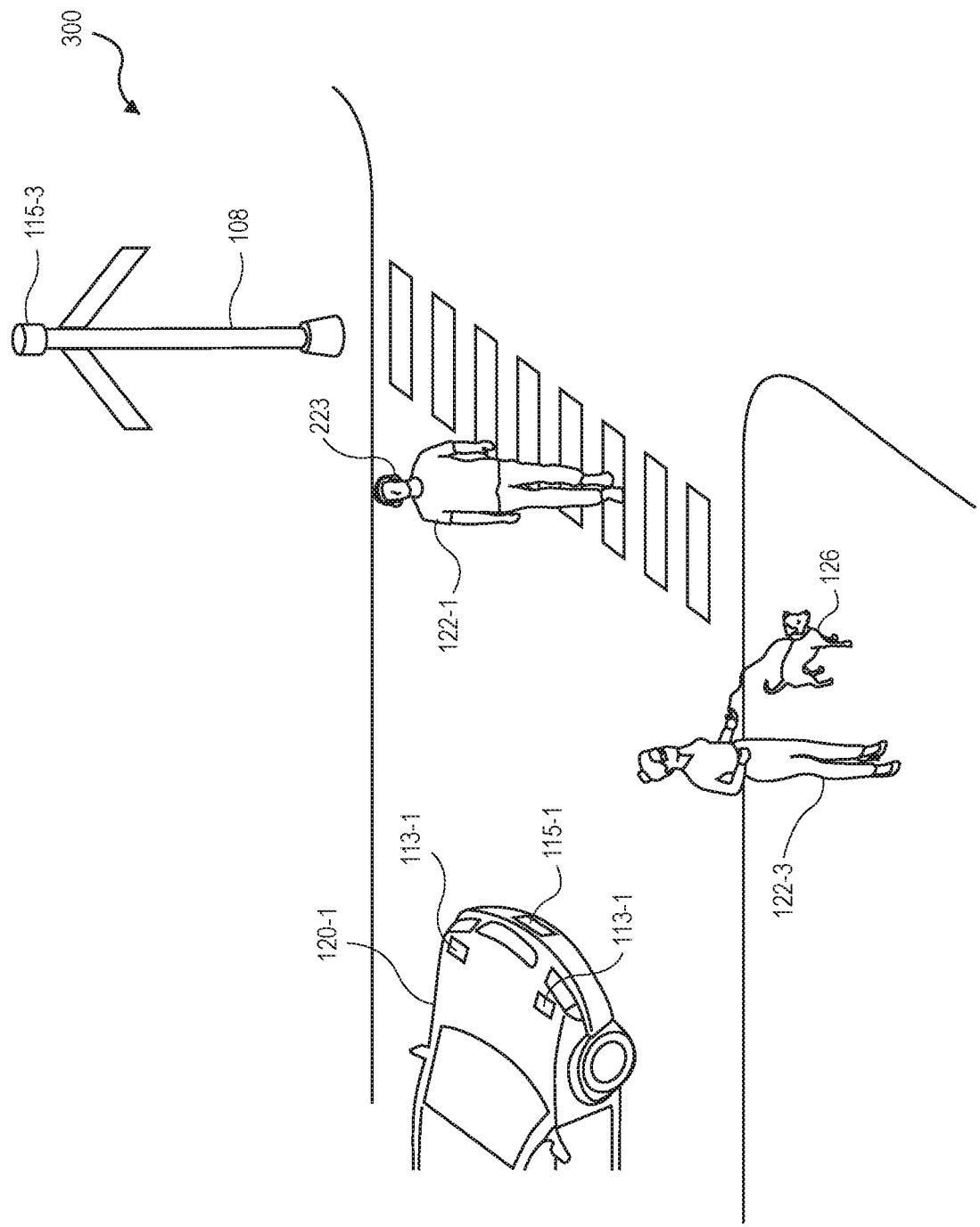
FIG. 3 is a schematic diagram of yet another example environment including a directed audio emission system, in accordance with implementations of the present disclosure.

FIG. 3 is a schematic diagram of yet another example environment 300 including a directed audio emission system, in accordance with implementations of the present disclosure.

As shown in FIG. 3, a vehicle 120-1 shown at the left side of FIG. 3, such as an autonomous vehicle, an electric vehicle, or other type of vehicle, may be approaching an intersection at which one or more pedestrians 122 and/or an animal, pet, or guide animal 126 may be present. The vehicle 120-1 may include one or more sensors 113-1 and an audio transmitter 115-1. In addition, the example environment of the intersection may further include a sign 108 or other structure or portion of the environment having an associated audio transmitter 115-3. As described herein, the one or more sensors 113-1 may comprise various types of sensors configured to detect one or more objects in proximity to the vehicle 120-1, and the audio transmitters 115-1, 115-3 may comprise phased array audio transmitters or other types of audio transmitters configured to emit directed audio toward one or more detected objects.

In the example embodiment shown in FIG. 3, the one or more sensors 113-1 associated with the vehicle 120-1 may receive data associated with one or more of the pedestrian 122-1 walking along the crosswalk at the intersection, and/or the pedestrian 122-3 standing at the corner of the intersection with a pet or guide animal 126. Based on the data received from the one or more sensors 113-1, a controller, which may be associated with the vehicle 120-1 and/or may be remote from the vehicle 120-1 and in communication with the vehicle 120-1, its components, and the audio transmitter 115-3 associated with the sign 108, may detect the pedestrians 122-1, 122-3 and the pet or guide animal 126, using various processing techniques or algorithms.

Similar to the discussion of FIG. 2, with respect to the pedestrian 122-1 walking along the crosswalk at the intersection, the controller may detect, based on the data received from the one or more sensors 113-1, various characteristics associated with the pedestrian 122-1. For example, the controller may detect that the pedestrian 122-1 is a person, who is positioned and oriented along the crosswalk, is at a particular range or distance in front of the vehicle 120-1, and is moving from left to right from the perspective of the vehicle 120-1 at a particular speed. Further, the controller may also detect, based on the data received from the one or more sensors 113-1, that the pedestrian 122-1 is using or wearing an audio input/output device 223, such as headphones. Other audio input/output devices 223 that may be detected may include phones, earbuds, virtual reality or augmented reality devices, or other devices.

Based on the detected characteristics of the pedestrian 122-1, the controller may determine or predict a potential safety situation between the vehicle 120-1 and the pedestrian 122-1, such as a potential collision, interference, or accident. As a result, the controller may determine to emit directed audio toward the pedestrian 122-1.

In the example embodiment shown in FIG. 3, the controller may select the audio transmitter 115-1 associated with the vehicle 120-1 and the audio transmitter 115-3 associated with the sign 108 to emit directed audio toward the pedestrian 122-1. In addition, the controller may select human-audible noises, sounds, or alerts and/or human-discernable information to emit as directed audio based on the determination that the detected object is a person, i.e., pedestrian 122-1. Further, the controller may select one or more audio characteristics for the directed audio to be emitted, such as amplitude, frequency, phase, direction, angle, range, or others. For example, the direction, angle, and/or range of the emitted audio output from each of the audio transmitters 115-1, 115-3 may be selected to focus on the position, orientation, range, and movement associated with the pedestrian 122-1 relative to the vehicle 120-1 and the sign 108, respectively. In addition, based on the determination that the pedestrian 122-1 is using or wearing an audio input/output device 223, the controller may select audio characteristics, such as a high amplitude, a particular frequency, or others in order to ensure that the pedestrian 122-1 may hear the emitted audio output despite using or wearing the audio input/output device 223. In other example embodiments, if the audio input/output device 223 includes a dedicated channel for alerts, warnings, or notifications, such as a dedicated radio frequency or band or other dedicated communication channel or bandwidth, the audio transmitters 115-1, 115-3 may emit directed audio using the dedicated channel that may interrupt or override any other audio provided by the audio input/output device, in order to ensure that the pedestrian 122-1 may hear the emitted audio output via the audio input/output device 223.

By using two or more audio transmitters 115 to emit directed audio to a particular object, such as a pedestrian, animal, vehicle, or device, various characteristics of the selected audio output may be selected to further direct or accentuate the audio output at a position associated with the particular object. For example, each of the audio transmitters may emit respective audio outputs at relatively low amplitudes such that the combined amplitude of the respective audio outputs is greatest at the position of the particular object and/or may be reduced or minimized at other positions in the environment. In addition, each of the audio transmitters may emit respective audio outputs at respective frequencies and/or phases such that the combined audio output is accentuated at the position of the particular object and/or may be reduced or canceled out at other positions in the environment. Further, each of the audio transmitters may emit respective audio outputs at respective directions and/or angles such that the combined audio output is focused at the position of the particular object and/or may be reduced or minimized at other positions in the environment. Moreover, each of the audio transmitters may emit respective audio outputs at respective ranges such that the audio output is directed toward the position of the particular object and/or may be reduced or minimized at relatively closer or relatively farther positions in the environment.

With respect to the pedestrian 122-3 and pet or guide animal 126 standing at the corner of the intersection, the controller may detect, based on the data received from the one or more sensors 113-1, various characteristics associated with the pedestrian 122-3 and pet or guide animal 126. For example, the controller may detect that the pedestrian 122-3 is a person, who is positioned and oriented at the corner of the intersection, is at a particular range or distance in front of and to the right of the vehicle 120-1, and is not currently moving but poised to enter the crosswalk in front of the vehicle 120-1. In addition, the controller may detect that the pet or guide animal 126 is a guide dog, who is positioned and oriented at the corner of the intersection, is at a particular range or distance in front of and to the right of the vehicle 120-1, and is not currently moving but poised to enter the crosswalk in front of the vehicle 120-1.

Based on the detected characteristics of the pedestrian 122-3 and guide animal 126, the controller may determine or predict a potential safety situation between the vehicle 120-1 and the pedestrian 122-3 and guide animal 126, such as a potential collision, interference, or accident. As a result, the controller may determine to emit directed audio toward the pedestrian 122-3 and the guide animal 126. Although the detection of a guide animal 126 may indicate that the pedestrian 122-3 is hearing-impaired, the controller may nonetheless determine to emit directed audio intended for the pedestrian 122-3 to account for the possibility of incorrectly detecting a guide animal, instead of simply a pet.

In the example embodiment shown in FIG. 3, the controller may select the audio transmitter 115-1 associated with the vehicle 120-1 and the audio transmitter 115-3 associated with the sign 108 to emit directed audio toward the pedestrian 122-3 and the guide animal 126. In addition, the controller may select human-audible noises, sounds, or alerts and/or human-discernable information to emit as directed audio based on the determination that one of the detected objects is a person, i.e., pedestrian 122-3, and the controller may select animal-audible noises, sounds, or alerts to emit as directed audio based on the determination that one of the detected objects is a dog, i.e., guide animal 126. Further, the controller may select one or more audio characteristics for the directed audio to be emitted, such as amplitude, frequency, phase, direction, angle, range, or others. For example, the direction, angle, and/or range of the emitted audio output from each of the audio transmitters 115-1, 115-3 may be selected to focus on the position, orientation, and range associated with the pedestrian 122-3 and the guide animal 126 relative to the vehicle 120-1.

As discussed above, by using two or more audio transmitters 115 to emit directed audio to particular objects, such as a pedestrian, animal, vehicle, or device, various characteristics of the selected audio output may be selected to further direct or accentuate the audio output at a position associated with the particular objects. For example, each of the audio transmitters may emit respective audio outputs at relatively low amplitudes such that the combined amplitude of the respective audio outputs is greatest at the position of the particular objects and/or may be reduced or minimized at other positions in the environment. In addition, each of the audio transmitters may emit respective audio outputs at respective frequencies and/or phases such that the combined audio output is accentuated at the position of the particular objects and/or may be reduced or canceled out at other positions in the environment. Further, each of the audio transmitters may emit respective audio outputs at respective directions and/or angles such that the combined audio output is focused at the position of the particular objects and/or may be reduced or minimized at other positions in the environment. Moreover, each of the audio transmitters may emit respective audio outputs at respective ranges such that the audio output is directed toward the position of the particular objects and/or may be reduced or minimized at relatively closer or relatively farther positions in the environment.

Using the directed audio emission systems and methods described herein, selected audio output having selected audio characteristics may be emitted toward each of the pedestrian 122-1, the pedestrian 122-3, and the guide animal 126 concurrently, substantially simultaneously, and/or sequentially by the audio transmitters 115-1, 115-3, or respective portions thereof. In addition, audio output directed toward each of the pedestrian 122-1, the pedestrian 122-3, and the guide animal 126 may not be audible, or only faintly audible, to others of the pedestrian 122-1, the pedestrian 122-3, and the guide animal 126, such that each pedestrian or animal may receive substantially only audio output that is specifically directed thereto. Further, other people, vehicles, animals, or other objects (not shown) that may also be in proximity to the vehicle 120-1 but that are not determined to be associated with potential safety situations with the vehicle 120-1 may also not receive, or only faintly receive, the selected audio output that is directed toward each of the pedestrian 122-1, the pedestrian 122-3, and the guide animal 126.

Although FIGS. 2 and 3 illustrate sensors 113 associated with vehicles and audio transmitters 115 associated with vehicles and/or signs or other structures or portions within the example environment, in other example embodiments, one or more sensors and/or one or more audio transmitters may be associated with various types, numbers, and combinations of vehicles, devices, and/or portions of the environment. In further example embodiments, more than two audio transmitters may be used to emit directed audio toward a particular object within an environment. In still further example embodiments, various combinations or groups of audio transmitters, including groups including only one audio transmitter, may be used to concurrently or substantially simultaneously emit directed audio having different selected audio characteristics to respective different particular objects within the environment. For example, a controller associated with a portion of the environment may detect a potential safety situation associated with two objects, such as two vehicles, or a vehicle and a pedestrian, and the controller may cause different respective groups of audio transmitters to provide respective audio outputs having different respective audio characteristics to each of the two objects concurrently or substantially simultaneously.

Figure 4:
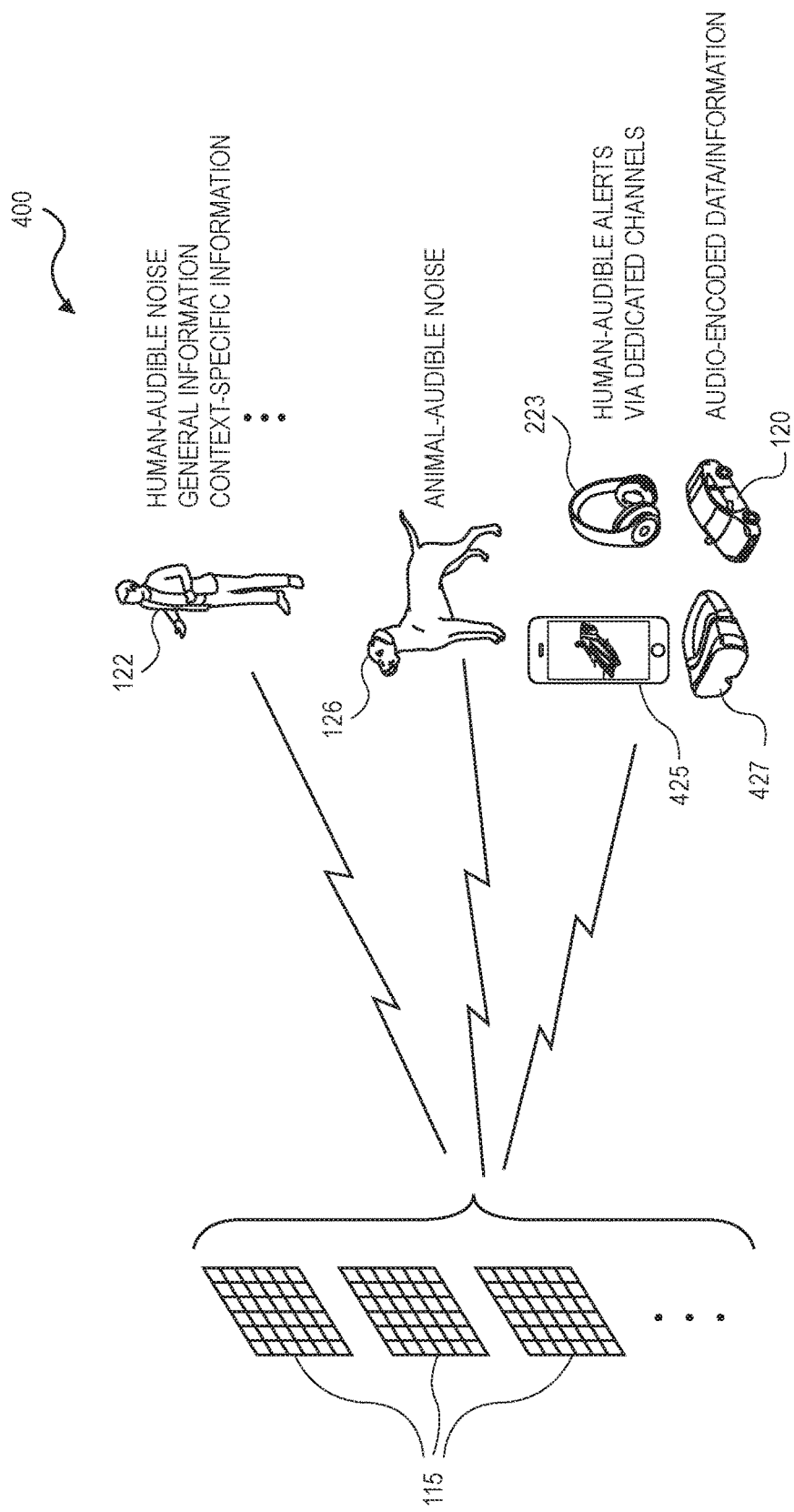
FIG. 4 is a schematic diagram of example audio outputs emitted by a directed audio emission system, in accordance with implementations of the present disclosure.

FIG. 4 is a schematic diagram of example audio outputs 400 emitted by a directed audio emission system, in accordance with implementations of the present disclosure.

In example embodiments, the various types of audio transmitters 115, such as phased array audio transmitters, may emit various different types of audio output having various audio characteristics. In some example embodiments, an audio transmitter may emit a single selected type of audio output. In other example embodiments, a first portion of an audio transmitter may emit a first selected type of audio output, and a second portion of an audio transmitter may emit a second selected type of audio output. In further example embodiments, an audio transmitter may emit a first selected type of audio output at a first time, and may emit a second selected type of audio output at a second time. Various other combinations of portions of audio transmitters, times of audio transmission, and types of audio output may be used to emit directed audio by one or more audio transmitters.

As shown in FIG. 4, a first type of audio output may include audio output intended for people 122. For example, the first type of audio output may include human-audible noise, e.g., noise within a range of frequencies that is generally audible by humans. The human-audible noise may comprise simulated vehicle noise, white noise, beeps, pulses, music, tones, or other types of sounds or noises. In addition, the first type of audio output may include human-discernable or human-understandable content, speech, or information. Further, the human-discernable information may include general alerts, warnings, or notifications and/or context-specific alerts, warnings, or notifications. General alerts may include standard content or speech such as "Watch for vehicles" or "Caution—stay alert" or "Look both ways before crossing a street," whereas context-specific alerts may include content or speech that is based on detected characteristics of a detected person, such as "Blue vehicle approaching from your left" or "Continue across the crosswalk to the sidewalk" or "Please take two steps back from the edge of the sidewalk." Various other types of general or context-specific alerts or notifications may be provided as the first type of audio output. Moreover, the context-specific alerts or notifications may be determined based on one or more characteristics associated with objects detected by one or more sensors within an environment.

As described herein, a controller may receive data from sensors, detect objects based on the sensor data, and detect one or more characteristics of the detected objects. Based on the detected objects and their characteristics, e.g., a person standing on a sidewalk, a person walking across a street, a person walking with a pet, a person using an audio input/output device, or others, the controller may determine to emit the first type of audio output intended for a particular person. Further, the controller may select various general alerts and/or context-specific alerts to emit based on the characteristics of the detected person, such as position, orientation, distance, movement, speed, acceleration, or others. In addition, the controller may select audio characteristics of the selected audio output, such as amplitude, frequency, phase, direction, angle, range, or others. Moreover, the controller may select one or more audio transmitters to emit the selected audio output having the selected audio characteristics toward the detected person.

In addition, as shown in FIG. 4, a second type of audio output may include audio output intended for animals 126. For example, the second type of audio output may include animal-audible noise, e.g., noise within a range of frequencies that is generally audible by animals, which may include frequencies that are not generally audible by humans. The animal-audible noise may comprise simulated vehicle noise, white noise, beeps, pulses, music, tones, or other types of sounds or noises. Various other types of noise, alerts, or warnings may be provided as the second type of audio output.

As described herein, a controller may receive data from sensors, detect objects based on the sensor data, and detect one or more characteristics of the detected objects. Based on the detected objects and their characteristics, e.g., an animal or pet on a sidewalk, an animal or pet entering or crossing a street, a person walking with a pet, or others, the controller may determine to emit the second type of audio output intended for a particular animal. Further, the controller may select various noise, alerts, or warnings to emit based on the characteristics of the detected animal, such as position, orientation, distance, movement, speed, acceleration, or others. In addition, the controller may select audio characteristics of the selected audio output, such as amplitude, frequency, phase, direction, angle, range, or others. Moreover, the controller may select one or more audio transmitters to emit the selected audio output having the selected audio characteristics toward the detected animal.

Further, as shown in FIG. 4, a third type of audio output may include audio output intended for vehicles 120, audio input/output devices, or other devices or systems, such as earbuds or headphones 223, phones or smartphones 425, and/or virtual reality or augmented reality devices 427. For example, the third type of audio output may include human-audible, human-discernable, or human-understandable content, speech, or information delivered via one or more dedicated channels associated with the vehicles, audio input/output devices, or other devices or systems. The one or more dedicated channels may comprise dedicated radio frequencies or bands or other dedicated communication channels or bandwidths, that may interrupt or override any other audio provided by the vehicles, audio input/output devices, or other devices or systems. Further, the human-discernable information may include general alerts, warnings, or notifications and/or context-specific alerts, warnings, or notifications. General alerts may include content or speech such as "Watch for vehicles" or "Caution—stay alert" or "Look both ways before crossing a street," whereas context-specific alerts may include content or speech such as "Blue vehicle approaching from your left" or "Continue across the crosswalk to the sidewalk" or "Please take two steps back from the edge of the sidewalk." Various other types of general or context-specific alerts or notifications may be provided as the third type of audio output. Moreover, the context-specific alerts or notifications may be determined based on one or more characteristics associated with objects detected by one or more sensors within an environment.

In addition, the third type of audio output may also include audio-encoded data or information intended for vehicles 120, audio input/output devices, or other devices or systems, such as earbuds or headphones 223, phones or smartphones 425, and/or virtual reality or augmented reality devices 427. For example, the third type of audio output may include data or information that is encoded within audio data and transmitted to vehicles, audio input/output devices, or other devices or systems. The audio-encoded data may comprise various sounds, sequences of sounds, or combinations of sounds that are emitted with various audio characteristics, such as different amplitudes, frequencies, phases, durations, or others. In addition, the audio-encoded data may be emitted at frequencies that may or may not be human-audible. The vehicles, audio input/output devices, or other devices or systems may receive the audio-encoded data and decode or translate the data based on stored data or decoding algorithms associated with sounds, sequences, or combinations of sounds to initiate or control one or more functions or operations of the vehicles, audio input/output devices, or other devices or systems. Further, the audio-encoded data may include instructions, commands, or other data to cause or initiate various functions or operations, such as emitting audio alerts, warnings, or notifications via one or more speakers of vehicles, phones, earbuds, headphones, virtual reality or augmented reality devices, or other devices, providing information via various visual input/output devices such as screens or displays of vehicles, phones, virtual reality or augmented reality devices, or other devices, emitting haptic alerts, warnings, or notifications via one or more haptic actuators of vehicles, phones, earbuds, headphones, virtual reality or augmented reality devices, or other devices, recommending or initiating various movement control actions or operations for vehicles, initiating other actions or operations for vehicles, phones, earbuds, headphones, virtual reality or augmented reality devices, or other devices, or other types of functions or operations.

As described herein, a controller may receive data from sensors, detect objects based on the sensor data, and detect one or more characteristics of the detected objects. Based on the detected objects and their characteristics, e.g., a person wearing or using an audio input/output device, such as phones, earbuds, headphones, virtual reality or augmented reality devices, or others, one or more vehicles in proximity, or other types of devices configured to receive audio-encoded data, the controller may determine to emit the third type of audio output intended for a particular vehicle, audio input/output device, or other device or system. Further, the controller may select various general alerts and/or context-specific alerts, and/or various audio-encoded data, to emit based on the characteristics of the detected vehicle, device, or system, such as position, orientation, distance, movement, speed, acceleration, or others. In addition, the controller may select audio characteristics of the selected audio output, such as amplitude, frequency, phase, direction, angle, range, duration, sequence of sounds, combinations of sounds, or others. Moreover, the controller may select one or more audio transmitters to emit the selected audio output having the selected audio characteristics toward the detected vehicle, device, or system.

Although FIG. 4 individually describes the emission of different types of audio output directed toward different detected objects having various characteristics, in other example embodiments, one or more audio transmitters may concurrently or substantially simultaneously emit different types of audio output directed toward respective detected objects, in order to provide audio alerts, warnings, notifications, data, or other information to a plurality of detected objects concurrently or substantially simultaneously. In further example embodiments, instead of determining types and/or audio characteristics of audio output to be emitted based on detected objects and their detected types, one or more audio transmitters may emit multiple or all different types of audio output, e.g., audio output intended for people, animals, and vehicles, devices, or systems, based on the detection of at least one object without further detecting or identifying a type of the at least one object. In this manner, the directed audio emission systems described herein may provide multiple or all different types of audio alerts, warnings, notifications, or information to a detected object, regardless of the type of the detected object, based on its position, orientation, distance, movement, etc., which may reduce or minimize the computational or processing load associated with determining the type or other identifying characteristics of the detected object.

Figure 5:
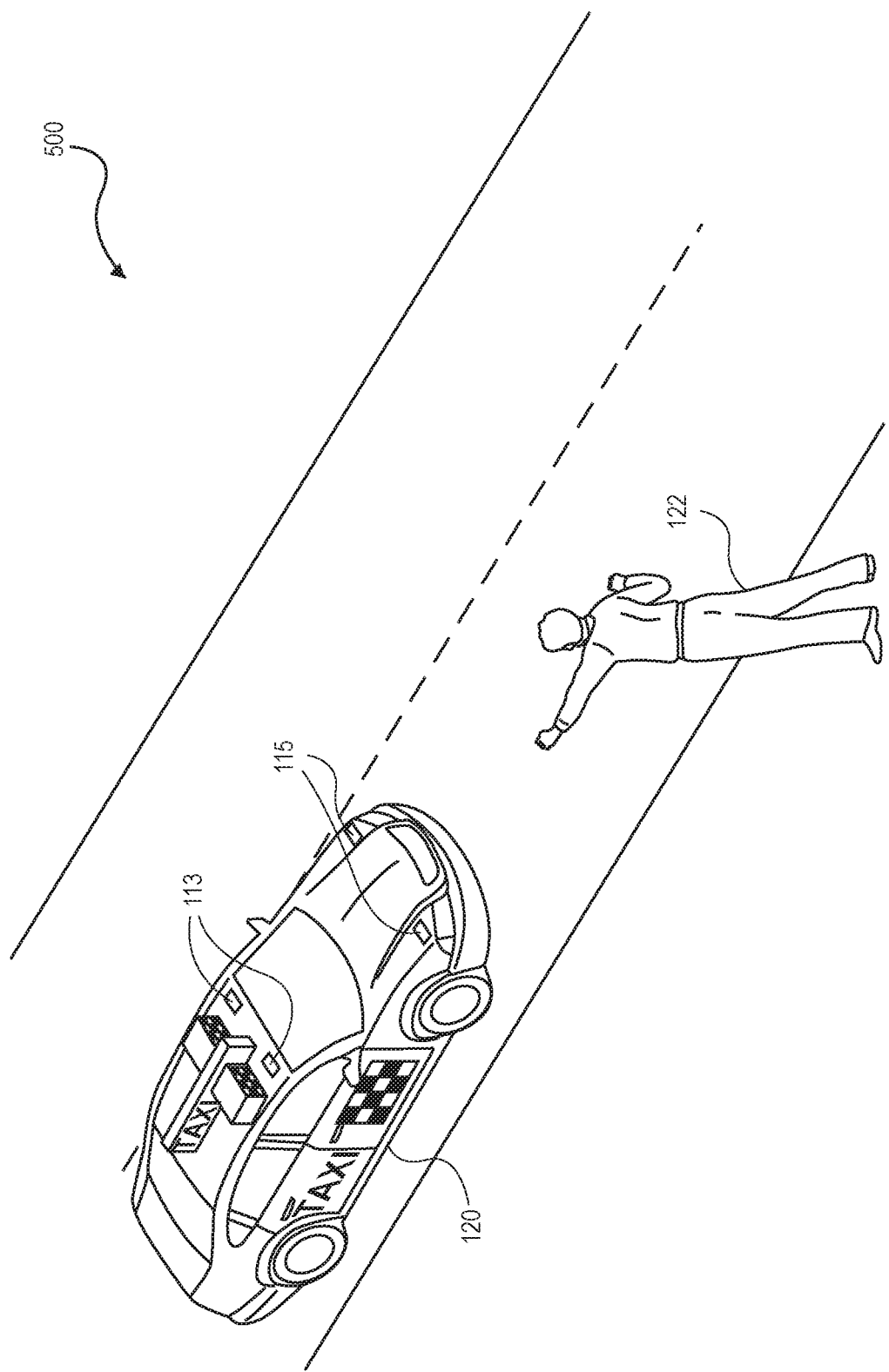
FIG. 5 is a schematic diagram of a further example environment including a directed audio emission system, in accordance with implementations of the present disclosure.

FIG. 5 is a schematic diagram of a further example environment 500 including a directed audio emission system, in accordance with implementations of the present disclosure.

As shown in FIG. 5, a vehicle 120, such as an autonomous vehicle, an electric vehicle, or other type of vehicle, may be traveling along a roadway and approaching a pedestrian 122 standing by the roadway. The vehicle 120 may be a taxi or other vehicle associated with a ridesharing service, and may include one or more sensors 113 and one or more audio transmitters 115. As described herein, the one or more sensors 113 may comprise various types of sensors configured to detect one or more objects in proximity to the vehicle 120, and the audio transmitters 115 may comprise phased array audio transmitters or other types of audio transmitters configured to emit directed audio toward one or more detected objects.

In the example embodiment shown in FIG. 5, the one or more sensors 113 associated with the vehicle 120 may receive data associated with the pedestrian 122 standing by the roadway. Based on the data received from the one or more sensors 113, a controller, which may be associated with the vehicle 120 and/or may be remote from the vehicle 120 and in communication with the vehicle 120 and its components, may detect the pedestrian 122 using various processing techniques or algorithms.

Further with respect to the pedestrian 122 standing by the roadway, the controller may detect, based on the data received from the one or more sensors 113, various characteristics associated with the pedestrian 122. For example, the controller may detect that the pedestrian 122 is a person, who is positioned and standing by the roadway, is at a particular range or distance in front of the vehicle 120, and is standing with a particular pose, e.g., with an arm and/or hand raised to flag down the vehicle 120. Further, in some example embodiments in which a person has previously reserved or requested a ride from the vehicle 120, e.g., using an application on a smartphone, the controller may also identify, based on the data received from the one or more sensors 113, that the pedestrian 122 is the same person associated with the previously reserved or requested ride. The identification of the pedestrian 122 may be previously enabled, permitted, or opted into as part of the previous reservation or request for the ride, and the one or more sensors 113 may identify the pedestrian 122 using image recognition techniques or algorithms, or other identifying features and associated recognition techniques, that may be provided by the person to enable such identification.

Based on the detected characteristics and/or identification of the pedestrian 122, the controller may determine an intended communication situation between the vehicle 120 and the pedestrian 122, in order to provide an ad-hoc ride to the person hailing the vehicle 120 and/or to confirm or initiate a previous ride reservation or request by the person.

As a result, the controller may determine to emit directed audio toward the pedestrian 122.

In the example embodiment shown in FIG. 5, the controller may select one or more audio transmitters 115 associated with the vehicle 120 to emit directed audio toward the pedestrian 122. In addition, the controller may select human-audible noises, sounds, or alerts and/or human-discernable information to emit as directed audio based on the determination that the detected object is a person, i.e., pedestrian 122. Further, the controller may select one or more audio characteristics for the directed audio to be emitted, such as amplitude, frequency, phase, direction, angle, range, or others. For example, the direction, angle, and/or range of the emitted audio output may be selected to focus on the position, orientation, range, and movement associated with the pedestrian 122 relative to the vehicle 120. In addition, various types of audio output may be emitted, such as sounds, tones, music, or other audio to indicate an approaching taxi or ridesharing vehicle, general information such as "Taxi vehicle is approaching," or context-specific information such as "Your requested ride is here. Please confirm with the driver of the blue sedan approaching from your left."

Using the directed audio emission systems and methods described herein, selected audio output having selected audio characteristics may be emitted toward the pedestrian 122 and/or other people, animals, vehicles, or devices concurrently, substantially simultaneously, and/or sequentially by the audio transmitters 115, or respective portions thereof. In addition, audio output directed toward the pedestrian 122 may not be audible, or only faintly audible, to other people, animals, vehicles, or devices including passersby or others in proximity to the pedestrian 122, such that substantially only the pedestrian 122 may receive audio output that is specifically directed thereto.

Figure 6:
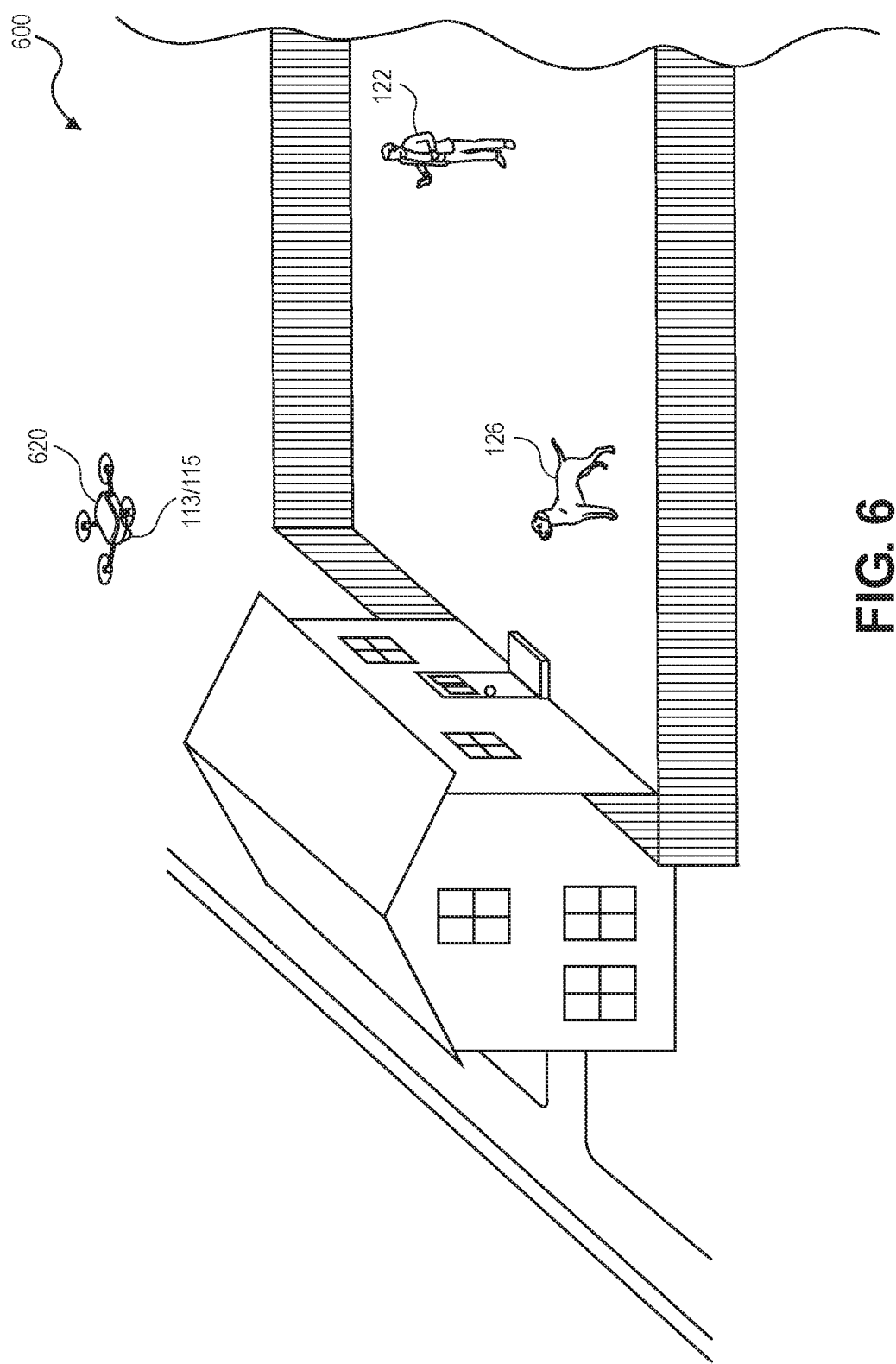
FIG. 6 is a schematic diagram of a still further example environment including a directed audio emission system, in accordance with implementations of the present disclosure.

FIG. 6 is a schematic diagram of a still further example environment 600 including a directed audio emission system, in accordance with implementations of the present disclosure.

As shown in FIG. 6, a vehicle 620, such as an unmanned or autonomous aerial vehicle, an electric aerial vehicle, or other type of aerial vehicle, may be navigating along a path and approaching a location, such as a customer location, delivery location, or other destination, at which a pedestrian or person 122, as well as an animal or pet 126, may be present. The vehicle 620 may be an unmanned aerial vehicle that is carrying an item, package, box, or other object that is intended for delivery to the person 122 at the delivery location, such as a backyard of a home of the person 122, and the vehicle 620 may include one or more sensors 113 and one or more audio transmitters 115. As described herein, the one or more sensors 113 may comprise various types of sensors configured to detect one or more objects in proximity to the vehicle 620, and the audio transmitters 115 may comprise phased array audio transmitters or other types of audio transmitters configured to emit directed audio toward one or more detected objects.

In the example embodiment shown in FIG. 6, the one or more sensors 113 associated with the vehicle 620 may receive data associated with the person 122 and the pet 126 that are present at the delivery location. Based on the data received from the one or more sensors 113, a controller, which may be associated with the vehicle 620 and/or may be remote from the vehicle 620 and in communication with the vehicle 620 and its components, may detect the person 122 and the pet 126 using various processing techniques or algorithms.

Further with respect to the person 122 standing at the delivery location, the controller may detect, based on the data received from the one or more sensors 113, various characteristics associated with the person 122. For example, the controller may detect that the person 122 is a person, who is positioned and standing proximate the delivery location, is at a particular range or distance relative to the vehicle 620, and may be holding or using a device, such as a phone, a tablet, earbuds or headphones, or other audio input/output devices. Further, in some example embodiments in which a person has previously reserved or requested a delivery from the vehicle 620, e.g., using an application on a smartphone, the controller may also identify, based on the data received from the one or more sensors 113, that the person 122 is the same person associated with the previously reserved or requested delivery. The identification of the person 122 may be previously enabled, permitted, or opted into as part of the previous reservation or request for the delivery, and the one or more sensors 113 may identify the person 122 using image recognition techniques or algorithms, or other identifying features and associated recognition techniques, that may be provided by the person to enable such identification.

Based on the detected characteristics and/or identification of the person 122, the controller may determine or predict a potential safety situation and/or an intended communication situation between the vehicle 620 and the person 122, in order to safely complete a delivery to the delivery location as reserved or requested by the person. As a result, the controller may determine to emit directed audio toward the person 122.

In the example embodiment shown in FIG. 6, the controller may select one or more audio transmitters 115 associated with the vehicle 620 to emit directed audio toward the person 122. In addition, the controller may select human-audible noises, sounds, or alerts and/or human-discernable information to emit as directed audio based on the determination that the detected object is a person, i.e., person 122. Further, the controller may select one or more audio characteristics for the directed audio to be emitted, such as amplitude, frequency, phase, direction, angle, range, or others. For example, the direction, angle, and/or range of the emitted audio output may be selected to focus on the position, orientation, range, and movement associated with the person 122 relative to the vehicle 620. In addition, various types of audio output may be emitted, such as sounds, tones, music, or other audio to indicate an approaching aerial vehicle, general information such as "An aerial delivery vehicle is approaching," or context-specific information such as "Your requested delivery is here. Please step away from the delivery location for your safety."

In addition, based on the determination that the person 122 is holding or using a phone, a tablet, earbuds or headphones, or other audio input/output devices, the controller may select audio characteristics, such as a high amplitude, a particular frequency, or others in order to ensure that the person 122 may hear the emitted audio output despite using or wearing the audio input/output device. In other example embodiments, if the audio input/output device includes a dedicated channel for alerts, warnings, or notifications, such as a dedicated radio frequency or band or other dedicated communication channel or bandwidth, the audio transmitters 115 may emit directed audio using the dedicated channel that may interrupt or override any other audio provided by the audio input/output device, in order to ensure that the person 122 may hear the emitted audio output via the audio input/output device.

With respect to the pet 126 standing at the delivery location, the controller may detect, based on the data received from the one or more sensors 113, various characteristics associated with the pet 126. For example, the controller may detect that the pet 126 is a dog, that is positioned and standing proximate the delivery location, is at a particular range or distance relative to the vehicle 620, and is not currently moving but poised to move toward the approaching vehicle 620.

Based on the detected characteristics of the pet 126, the controller may determine or predict a potential safety situation between the vehicle 620 and the pet 126, such as a potential collision, interference, or accident. As a result, the controller may determine to emit directed audio toward the pet 126.

In the example embodiment shown in FIG. 6, the controller may select one or more audio transmitters 115 associated with the vehicle 620 to emit directed audio toward the pet 126. In addition, the controller may select animal-audible noises, sounds, or alerts to emit as directed audio based on the determination that the detected object is a dog, i.e., pet 126. Further, the controller may select one or more audio characteristics for the directed audio to be emitted, such as amplitude, frequency, phase, direction, angle, range, or others. For example, the direction, angle, and/or range of the emitted audio output from each of the audio transmitters 115 may be selected to focus on the position, orientation, and range associated with the pet 126 relative to the vehicle 620.

Using the directed audio emission systems and methods described herein, selected audio output having selected audio characteristics may be emitted toward the person 122, the pet 126, and/or other people, animals, vehicles, or devices concurrently, substantially simultaneously, and/or sequentially by the audio transmitters 115, or respective portions thereof. In addition, audio output directed toward the person 122 and the pet 126 may not be audible, or only faintly audible, to other people, animals, vehicles, or devices including neighbors, passersby, or others in proximity to a customer location, delivery location, or other destination, such that substantially only the person 122 and the pet 126 may receive audio output that is specifically directed thereto.

Figure 7:
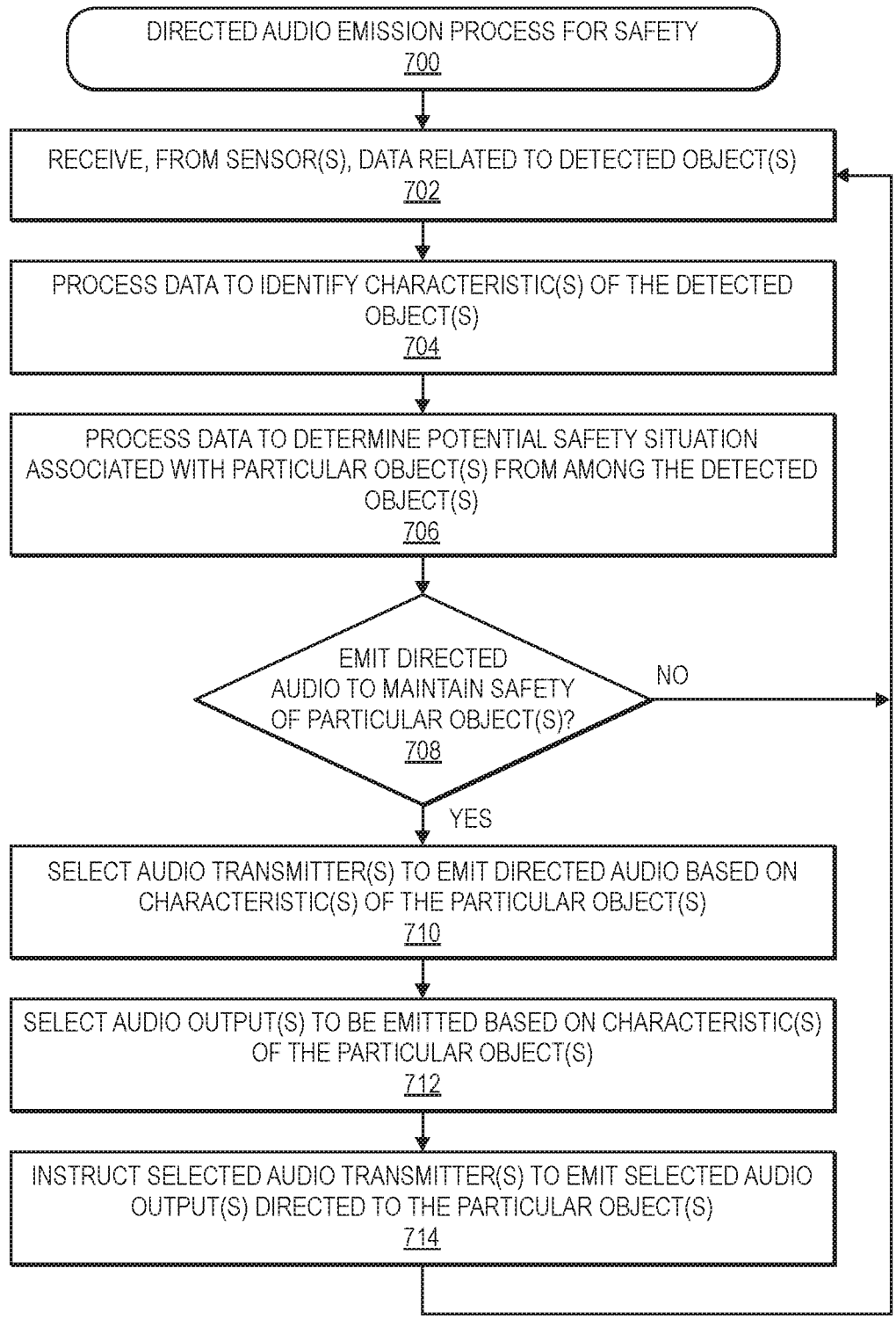
FIG. 7 is a flow diagram illustrating an example directed audio emission process for safety, in accordance with implementations of the present disclosure.

FIG. 7 is a flow diagram illustrating an example directed audio emission process for safety 700, in accordance with implementations of the present disclosure.

The process 700 may begin by receiving, from one or more sensors, data related to one or more detected objects, as at 702. For example, various types of sensors, such as imaging, infrared, depth or time-of-flight, audio, radar, LIDAR, or other sensors, may be associated with vehicles, devices, and/or portions of an environment, and the one or more sensors may detect objects in proximity to the vehicles, devices, and/or portions of the environment. The detected objects may comprise vehicles, people, animals, devices or objects associated with, worn by, or used by people, or other devices, systems, or objects. In addition, a controller may receive the data from the sensors associated with objects detected in proximity to the vehicles, devices, and/or portions of the environment.

The process 700 may continue by processing the data to identify one or more characteristics of the one or more detected objects, as at 704. For example, various characteristics of the detected objects may be determined, such as object type, position, orientation, distance, movement, speed, acceleration, or others. The object type may comprise a person, an animal, a vehicle, or other device or system, and the position, orientation, distance, movement, speed, and/or acceleration may be determined relative to the one or more sensors, and/or as absolute values within the environment. In addition, a controller may determine the various characteristics of the one or more detected objects using various processing techniques or algorithms, such as image processing algorithms, audio data processing algorithms, radar data processing algorithms, LIDAR data processing algorithms, and/or other types of processing algorithms associated with the various sensors and their data.

The process 700 may proceed by processing the data to determine a potential safety situation associated with one or more particular objects from among the one or more detected objects, as at 706. For example, based on the detected objects and their respective detected characteristics, a potential safety situation, such as a collision, interference, or accident, may be determined or predicted between one or more particular objects, such as between a first vehicle and a second vehicle, between a vehicle and a person, between a vehicle and an animal, or between other combinations of two or more objects. The determination or prediction of a potential safety situation may be based on various detected characteristics of the particular objects, such as position, orientation, distance, movement, speed, and/or acceleration. In addition, a controller may determine or predict potential safety situations associated with one or more particular objects utilizing various predictive or analytical models, techniques, or algorithms, such as physics models, geometric models, path planning models, mapping models, three-dimensional space models, or other types of processing and analysis techniques.

The process 700 may then continue to determine whether to emit directed audio to maintain safety of one or more particular objects, as at 708. For example, if a potential safety situation is not determined or predicted associated with one or more particular objects from among the one or more detected objects, then the process 700 may return to step 702 to continue to receive data from one or more sensors related to one or more detected objects within an environment.

If, however, a potential safety situation is determined or predicted associated with one or more particular objects from among the one or more detected objects, the process 700 may then proceed to select one or more audio transmitters to emit directed audio based on the one or more characteristics of the one or more particular objects, as at 710. For example, various types of audio transmitters, such as phased array audio transmitters or other types of audio transmitters configured to emit directed, focused, or beam-formed audio, may be associated with vehicles, devices, and/or portions of an environment, and one or more audio transmitters may be selected to emit directed audio to the one or more particular objects associated with the potential safety situation. The selected one or more audio transmitters may be associated with vehicles, devices, portions of the environment, or various combinations thereof. Further, the one or more audio transmitters may be selected in order to emit directed audio having particular audio characteristics to the one or more particular objects associated with the potential safety situation. In addition, a controller may select the one or more audio transmitters to emit the directed audio toward the particular objects based on their respective characteristics, such as position, orientation, distance, movement, speed, and/or acceleration.

The process 700 may continue with selecting one or more audio outputs to be emitted based on one or more characteristics of the one or more particular objects, as at 712. For example, based on an object type of a particular object, an audio output or signal may be selected that is intended for humans, animals, vehicles, or other devices or systems. Further, based on the object type, as well as other characteristics of the particular object, various other audio characteristics may also be selected, such as amplitude, frequency, phase, direction, angle, range, or others, in order to emit directed audio toward the particular object that will be effectively received and/or heard by the particular object. In addition, a controller may select a type of audio output or signal, as well as various characteristics of the audio output or signal, in order to emit directed audio toward a particular object associated with a potential safety situation. In other example embodiments, the steps 710 and 712 may be performed concurrently or substantially in parallel, and/or the order of steps 710 and 712 may be reversed.

The process 700 may then proceed with instructing the one or more selected audio transmitters to emit the one or more selected audio outputs directed to the one or more particular objects, as at 714. For example, the selected audio transmitters that may be associated with vehicles, devices, and/or portions of the environment may be instructed to emit directed audio, and the emitted directed audio may be a selected audio output type having various selected audio characteristics. In addition, a controller may cause the selected audio transmitters to emit the selected audio outputs or signals having selected audio characteristics toward one or more particular objects associated with a potential safety situation.

The process 700 may then return to step 702 to continue to receive data from one or more sensors related to one or more detected objects within an environment, and substantially repeat the process described above.

In this manner, directed audio may be emitted toward one or more particular objects associated with a potential safety situation, while reducing or minimizing sounds or noise that may reach or be audible by other people, animals, vehicles, or other devices within the environment that are not associated with the potential safety situation. Further, the directed audio may be tailored or customized based on detected characteristics of the one or more particular objects in order to effectively improve safety associated with vehicles, people, animals, and other devices or systems that may be present and operating together or in proximity within various environments.

Figure 8:
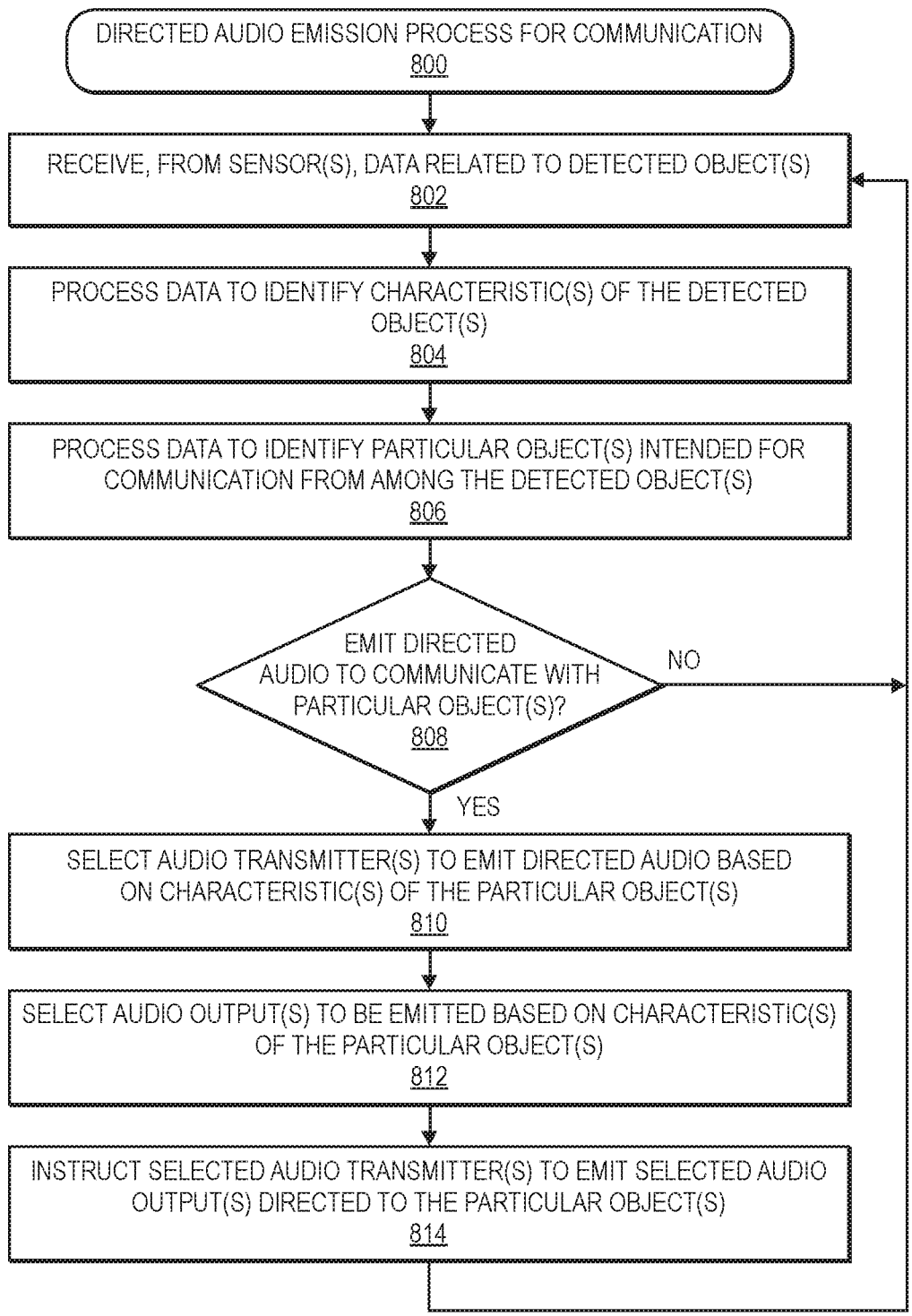
FIG. 8 is a flow diagram illustrating an example directed audio emission process for communication, in accordance with implementations of the present disclosure.

FIG. 8 is a flow diagram illustrating an example directed audio emission process for communication 800, in accordance with implementations of the present disclosure.

The process 800 may begin by receiving, from one or more sensors, data related to one or more detected objects, as at 802. For example, various types of sensors, such as imaging, infrared, depth or time-of-flight, audio, radar, LIDAR, or other sensors, may be associated with vehicles, devices, and/or portions of an environment, and the one or more sensors may detect objects in proximity to the vehicles, devices, and/or portions of the environment. The detected objects may comprise vehicles, people, animals, devices or objects associated with, worn by, or used by people, or other devices, systems, or objects. In addition, a controller may receive the data from the sensors associated with objects detected in proximity to the vehicles, devices, and/or portions of the environment.

The process 800 may continue by processing the data to identify one or more characteristics of the one or more detected objects, as at 804. For example, various characteristics of the detected objects may be determined, such as object type, position, orientation, distance, movement, speed, acceleration, or others. The object type may comprise a person, an animal, a vehicle, or other device or system, and the position, orientation, distance, movement, speed, and/or acceleration may be determined relative to the one or more sensors, and/or as absolute values within the environment. In addition, a controller may determine the various characteristics of the one or more detected objects using various processing techniques or algorithms, such as image processing algorithms, audio data processing algorithms, radar data processing algorithms, LIDAR data processing algorithms, and/or other types of processing algorithms associated with the various sensors and their data.

The process 800 may proceed by processing the data to identify one or more particular objects intended for communication from among the one or more detected objects, as at 806. For example, one or more particular objects, such as a person, customer, requester, or other person, animal, vehicle, or other device may be identified, which identification may further be based on the detected objects and their respective detected characteristics. The identification or determination of a potential intended communication situation may be based on various detected characteristics of the particular objects, such as object type, position, orientation, distance, movement, speed, and/or acceleration, as well as previously received and/or stored data or information related to individuals who may have reserved or requested a ride from a ridesharing service, may have reserved or requested a delivery from a package delivery service, and/or may have previously reserved or requested a different type of interaction with one or more particular objects in an environment. In addition, a controller may identify or determine one or more particular objects associated with potential intended communication situations utilizing various processing techniques or algorithms, such as image processing algorithms, audio data processing algorithms, radar data processing algorithms, LIDAR data processing algorithms, and/or other types of processing algorithms associated with the various sensors and their data.

The process 800 may then continue to determine whether to emit directed audio to communicate with one or more particular objects, as at 808. For example, if a potential intended communication situation is not determined or identified associated with one or more particular objects from among the one or more detected objects, then the process 800 may return to step 802 to continue to receive data from one or more sensors related to one or more detected objects within an environment.

If, however, a potential intended communication situation is determined or identified associated with one or more particular objects from among the one or more detected objects, the process 800 may then proceed to select one or more audio transmitters to emit directed audio based on the one or more characteristics of the one or more particular objects, as at 810. For example, various types of audio transmitters, such as phased array audio transmitters or other types of audio transmitters configured to emit directed, focused, or beam-formed audio, may be associated with vehicles, devices, and/or portions of an environment, and one or more audio transmitters may be selected to emit directed audio to the one or more particular objects associated with the potential intended communication situation. The selected one or more audio transmitters may be associated with vehicles, devices, portions of the environment, or various combinations thereof. Further, the one or more audio transmitters may be selected in order to emit directed audio having particular audio characteristics to the one or more particular objects associated with the potential intended communication situation. In addition, a controller may select the one or more audio transmitters to emit the directed audio toward the particular objects based on their respective characteristics, such as position, orientation, distance, movement, speed, and/or acceleration.

The process 800 may continue with selecting one or more audio outputs to be emitted based on one or more characteristics of the one or more particular objects, as at 812. For example, based on an object type of a particular object, an audio output or signal may be selected that is intended for humans, animals, vehicles, or other devices or systems. Further, based on the object type, as well as other characteristics of the particular object, various other audio characteristics may also be selected, such as amplitude, frequency, phase, direction, angle, range, or others, in order to emit directed audio toward the particular object that will be effectively received and/or heard by the particular object. In addition, a controller may select a type of audio output or signal, as well as various characteristics of the audio output or signal, in order to emit directed audio toward a particular object associated with a potential intended communication situation. In other example embodiments, the steps 810 and 812 may be performed concurrently or substantially in parallel, and/or the order of steps 810 and 812 may be reversed.

The process 800 may then proceed with instructing the one or more selected audio transmitters to emit the one or more selected audio outputs directed to the one or more particular objects, as at 814. For example, the selected audio transmitters that may be associated with vehicles, devices, and/or portions of the environment may be instructed to emit directed audio, and the emitted directed audio may be a selected audio output type having various selected audio characteristics. In addition, a controller may cause the selected audio transmitters to emit the selected audio outputs or signals having selected audio characteristics toward one or more particular objects associated with a potential intended communication situation.

The process 800 may then return to step 802 to continue to receive data from one or more sensors related to one or more detected objects within an environment, and substantially repeat the process described above.

In this manner, directed audio may be emitted toward one or more particular objects associated with a potential intended communication situation, while reducing or minimizing sounds or noise that may reach or be audible by other people, animals, vehicles, or other devices within the environment that are not associated with the potential intended communication situation. Further, the directed audio may be tailored or customized based on detected characteristics of the one or more particular objects in order to effectively improve communication with particular vehicles, people, animals, and other devices or systems that may be present and operating together or in proximity within various environments.

FIG. 9 is a block diagram illustrating various components of an example control system 900, in accordance with implementations of the present disclosure.

Various operations of a control system or controller, such as those described herein, may be executed on one or more computer systems, and/or interacting with various other computers, systems, or devices in an environment, according to various implementations. For example, the control system or controller discussed above may function and operate on one or more computer systems. One such control system is illustrated by the block diagram in FIG. 9. In the illustrated implementation, a control system 900 includes one or more processors 910A, 910B through 910N, coupled to a non-transitory computer-readable storage medium 920 via an input/output (I/O) interface 930. The control system 900 further includes a network interface 940 coupled to the I/O interface 930, and one or more input/output devices 950.

In some implementations, it is contemplated that a described implementation may be implemented using a single instance of the control system 900 while, in other implementations, multiple such systems or multiple nodes making up the control system 900 may be configured to host different portions or instances of the described implementations. For example, in one implementation, some data sources or services (e.g., related to portions of directed audio emission systems, operations, or processes, etc.) may be implemented via one or more nodes of the control system 900 that are distinct from those nodes implementing other data sources or services (e.g., related to other portions of directed audio emission systems, operations, or processes, etc.). In example embodiments, one or more portions, or all, of the various components of the example control system may be incorporated into one or more autonomous and/or electric ground vehicles, autonomous and/or electric aerial vehicles, other vehicles, portions of the environment, and/or other portions or components of the directed audio emission systems described herein.

In various implementations, the control system 900 may be a uniprocessor system including one processor 910A, or a multiprocessor system including several processors 910A-910N (e.g., two, four, eight, or another suitable number). The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory, computer-readable storage medium may include storage media or memory media such as magnetic or optical media, e.g., disk or CD/DVD-ROM, coupled to the control system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some implementations, the I/O interface 930 may perform any necessary protocol, timing or other data transformations to convert data signals from one component (e.g., non-transitory computer-readable storage medium 920) into a format suitable for use by another component (e.g., processors 910A-910N). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processors 910A-910N.

The network interface 940 may be configured to allow data to be exchanged between the control system 900 and other devices attached to a network, such as other control systems, traffic or vehicle management systems, other computer systems, vehicle control systems, audio input/output device controllers, various types of sensors, various types of audio transmitters, or between nodes of the control system 900. In various implementations, the network interface 940 may support communication via wired or wireless general data networks, such as any suitable type of satellite, cellular, Ethernet, WiFi, Bluetooth, or other communications network.

Input/output devices 950 may, in some implementations, include one or more screens, displays, visual input/output devices, audio input/output devices, keyboards, keypads, touchpads, scanning devices, imaging devices, sensors, audio transmitters, voice or optical recognition devices, or any other devices suitable for entering or retrieving data by one or more control systems 900. Multiple input/output devices 950 may be present in the control system 900 or may be distributed on various nodes of the control system 900. In some implementations, similar input/output devices may be separate from the control system 900 and may interact with one or more nodes of the control system 900 through a wired or wireless connection, such as over the network interface 940.

As shown in FIG. 9, the memory 920 may include program instructions 925 that may be configured to implement one or more of the described implementations and/or provide data storage 935, which may comprise various tables, data stores and/or other data structures accessible by the program instructions 925. The program instructions 925 may include various executable instructions, programs, or applications to facilitate receipt of sensor data, processing of sensor data to detect objects and characteristics thereof, processing of sensor data to determine, predict, or identify potential safety situations and/or potential intended communication situations, selection of audio transmitters to emit directed audio, selection of audio output and audio characteristics thereof to be emitted, causing emission of directed audio, etc. The data storage 935 may include various data stores for maintaining data related to systems, operations, or processes described herein, such as sensors, audio transmitters, environments, objects including vehicles, people, animals, devices, or others, detected characteristics of objects, identifications of objects, potential safety situations, potential intended communication situations, types of audio output, audio characteristics of audio output, etc.

Those skilled in the art will appreciate that the control system 900 is merely illustrative and is not intended to limit the scope of implementations. In particular, the control system and devices may include any combination of hardware or software that can perform the indicated functions, including other control systems or controllers, computers, network devices, internet appliances, robotic devices, vehicles, audio input/output devices, etc. The control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 7 and 8, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An electric vehicle, comprising:
    a sensor;
    a plurality of phased array audio transmitters; and
    a controller configured to at least:
       receive, from the sensor, data associated with an environment of the electric vehicle;
       detect an object in proximity to the electric vehicle based at least in part on the data received from the sensor, wherein the object comprises at least one of an audio input/output device, headphones, a phone, a virtual reality or augmented reality device, a user device, or a vehicle;
       determine at least one characteristic associated with the object based at least in part on the data received from the sensor;
       identify a potential safety situation between the electric vehicle and the object based at least in part on the at least one characteristic associated with the object;
       select at least one phased array audio transmitter of the plurality of phased array audio transmitters to emit directed audio-encoded data toward the object;
       select audio characteristics of the directed audio-encoded data to be emitted by the selected at least one phased array audio transmitter toward the object based at least in part on the at least one characteristic associated with the object, wherein the audio characteristics of the directed audio-encoded data are selected to encode at least one instruction to be executed by the object; and
       cause emission, by the selected at least one phased array audio transmitter, of the directed audio-encoded data having the selected audio characteristics toward the object.

2. The electric vehicle of claim 1, wherein the sensor comprises at least one of an imaging sensor, an infrared sensor, a depth sensor, an audio sensor, a radar sensor, or a LIDAR sensor.

3. The electric vehicle of claim 1, wherein each of the plurality of phased array audio transmitters is configured to emit directed audio-encoded data that is beam formed in a direction toward the object.

4. The electric vehicle of claim 1, wherein the at least one characteristic associated with the object comprises at least one of an object type, a position, an orientation, a distance, a movement, a speed, or an acceleration associated with the object.

5. A directed audio-encoded data emission system, comprising:
    at least one sensor;
    at least one audio transmitter; and
    a controller configured to at least:
       detect at least one object in an environment of the directed audio-encoded data emission system based at least in part on data received from the at least one sensor, wherein the at least one object comprises at least one of an audio input/output device, headphones, a phone, a virtual reality or augmented reality device, a user device, or a vehicle;
       determine at least one characteristic associated with the at least one object based at least in part on the data received from the at least one sensor;
       determine to emit directed audio-encoded data toward the at least one object based at least in part on the at least one characteristic associated with the at least one object;
       select at least one audio characteristic of the directed audio-encoded data to be emitted by the at least one audio transmitter toward the at least one object based at least in part on the at least one characteristic associated with the at least one object, wherein the at least one audio characteristic of the directed audio-encoded data is selected to encode at least one instruction to be executed by the at least one object; and
       cause emission, by the at least one audio transmitter, of the directed audio-encoded data having the selected at least one audio characteristic toward the at least one object.

6. The directed audio-encoded data emission system of claim 5, wherein the at least one sensor comprises a plurality of sensors, and
    wherein each of the plurality of sensors is associated with at least one of a vehicle, a user device, or a portion of the environment of the directed audio-encoded data emission system.

7. The directed audio-encoded data emission system of claim 6, wherein each of the plurality of sensors comprises at least one of an imaging sensor, an infrared sensor, a depth sensor, an audio sensor, a radar sensor, or a LIDAR sensor.

8. The directed audio-encoded data emission system of claim 5, wherein the at least one characteristic associated with the at least one object comprises at least one of an object type, a position, an orientation, a distance, a movement, a speed, or an acceleration associated with the at least one object.

9. The directed audio-encoded data emission system of claim 5, wherein the at least one audio characteristic of the directed audio-encoded data comprises at least one of a sequence of sounds, a combination of sounds, a duration, an amplitude, a frequency, a phase, a direction, an angle, or a range.

10. The directed audio-encoded data emission system of claim 5, wherein the at least one instruction comprises an instruction to cause an audio output device associated with the at least one object to emit an audio notification.

11. The directed audio-encoded data emission system of claim 5, wherein the at least one instruction comprises an instruction to cause a visual output device associated with the at least one object to display a visual notification.

12. The directed audio-encoded data emission system of claim 5, wherein the at least one instruction comprises an instruction to cause a haptic output device associated with the at least one object to actuate a haptic notification.

13. The directed audio-encoded data emission system of claim 5, wherein the at least one instruction comprises an instruction to initiate at least one function or operation by the at least one object.

14. The directed audio-encoded data emission system of claim 5, wherein detecting at least one object in the environment of the directed audio-encoded data emission system further comprises detecting at least two objects in the environment; and wherein determining to emit directed audio-encoded data toward the at least one object further comprises identifying at least one of a potential safety situation or an intended communication situation between the at least two objects based at least in part on the at least one characteristic associated with the at least one object.

15. A computer-implemented method to emit directed audio-encoded data, comprising:

detecting, by a controller of a directed audio-encoded data emission system, at least one object in an environment of the directed audio-encoded data emission system based at least in part on data received from at least one sensor, wherein the at least one object comprises at least one of an audio input/output device, headphones, a phone, a virtual reality or augmented reality device, a user device, or a vehicle;

determining, by the controller, at least one characteristic associated with the at least one object based at least in part on the data received from the at least one sensor;

determining, by the controller, to emit directed audio-encoded data toward the at least one object based at least in part on the at least one characteristic associated with the at least one object;

selecting, by the controller, at least one audio characteristic of the directed audio-encoded data to be emitted by the at least one audio transmitter toward the at least one object based at least in part on the at least one characteristic associated with the at least one object, wherein the at least one audio characteristic of the directed audio-encoded data is selected to encode at least one instruction to be executed by the at least one object; and causing, by the controller, emission of the directed audio-encoded data having the selected at least one audio characteristic by the at least one audio transmitter toward the at least one object.

16. The computer-implemented method of claim 15, wherein the at least one audio characteristic of the directed audio-encoded data comprises at least one of a sequence of sounds, a combination of sounds, a duration, an amplitude, a frequency, a phase, a direction, an angle, or a range.

17. The computer-implemented method of claim 15, wherein the at least one instruction comprises an instruction to cause at least one of an audio output device, a visual output device, or a haptic output device associated with the at least one object to provide at least one notification.

* * * * *